US012573399B2

(12) United States Patent
Tasaki et al.

(10) Patent No.: US 12,573,399 B2
(45) Date of Patent: Mar. 10, 2026

(54) DISPLAY CONTROL DEVICE AND DISPLAY CONTROL METHOD

(71) Applicant: Nissan Motor Co., Ltd., Yokohama (JP)

(72) Inventors: Masaru Tasaki, Kanagawa (JP); Eiji Sonezaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 197 days.

(21) Appl. No.: 18/565,573

(22) PCT Filed: Jun. 3, 2021

(86) PCT No.: PCT/JP2021/021239
§ 371 (c)(1),
(2) Date: Nov. 30, 2023

(87) PCT Pub. No.: WO2022/254670
PCT Pub. Date: Dec. 8, 2022

(65) Prior Publication Data
US 2024/0265918 A1    Aug. 8, 2024

(51) Int. Cl.
*G10L 15/22*        (2006.01)
*G06F 3/16*        (2006.01)
*G10L 15/01*        (2013.01)

(52) U.S. Cl.
CPC .............. *G10L 15/22* (2013.01); *G06F 3/167* (2013.01); *G10L 15/01* (2013.01); *G10L 2015/223* (2013.01)

(58) Field of Classification Search
CPC ... G10L 15/22; G10L 15/01; G10L 2015/223; G06F 3/167; B60R 16/0373
See application file for complete search history.

(56) References Cited

U.S. PATENT DOCUMENTS

2014/0350925 A1* 11/2014 Park ........................ G10L 15/22
                                                        704/231
2018/0025728 A1*  1/2018 Bae .................. H04N 21/42222
                                                        704/251
(Continued)

FOREIGN PATENT DOCUMENTS

JP        2002-168643 A      6/2002
JP        2013-25605 A      2/2013
(Continued)

OTHER PUBLICATIONS

Extended European Search Report of Mar. 22, 2024 of corresponding European Patent Application No. 21943348.9.

*Primary Examiner* — Abul K Azad
(74) *Attorney, Agent, or Firm* — Spencer Fane LLP

(57)            ABSTRACT

A display control device includes a controller having a voice recognition unit and a display control unit. The voice recognition unit detects voice input from an occupant and recognizes the voice by voice processing of the detected voice. The display control unit causes a display to display a main screen including an operating state image indicating the operating state of a dialogue system, and a category screen including a category image in which commands are grouped. The controller causes the display to display the main screen before the voice recognition unit detects the voice, causes the display to display the category screen when the voice processing is not completed normally, and changes the display screen from the category screen to another screen when a category is selected in a state in which the category screen is displayed.

17 Claims, 25 Drawing Sheets

(56) References Cited

U.S. PATENT DOCUMENTS

| | | | | |
|---|---|---|---|---|
| 2019/0012137 A1* | 1/2019 | Lim | .......................... | G06F 3/01 |
| 2019/0035399 A1* | 1/2019 | Chakladar | ............... | G10L 15/26 |
| 2022/0057989 A1* | 2/2022 | Watanabe | ............. | G06F 3/0485 |
| 2023/0350707 A1* | 11/2023 | Kim | ...................... | G06F 3/0481 |

FOREIGN PATENT DOCUMENTS

| | | | |
|---|---|---|---|
| JP | 2020-144274 A | 9/2020 |
| WO | 2016/002406 A1 | 1/2016 |
| WO | 2020/137607 A1 | 7/2020 |

* cited by examiner

|  | FIRST DIALOGUE SYSTEM | SECOND DIALOGUE SYSTEM |
|---|---|---|
| WAKE-UP WORD | CAN BE ACTIVATED | CANNOT BE ACTIVATED |
| STEERING WHEEL SWITCH | USER SETTING (EXCLUSIVE SELECTION) | USER SETTING (EXCLUSIVE SELECTION) |

FIG. 3A

|  | FIRST DIALOGUE SYSTEM | SECOND DIALOGUE SYSTEM |
|---|---|---|
| WAKE-UP WORD | USER SETTING (EXCLUSIVE SELECTION) | USER SETTING (EXCLUSIVE SELECTION) |
| STEERING WHEEL SWITCH | USER SETTING (EXCLUSIVE SELECTION) | USER SETTING (EXCLUSIVE SELECTION) |

FIG. 3B

| Customer | | AI | |
|---|---|---|---|
| JAPANESE | | JAPANESE | |
| HEY, OO | | | |
| | | PLEASE INPUT BY VOICE, OR SELECT, A COMMAND | |
| SET THE AIR CONDITIONER TEMPERATURE TO 25 DEGREES | | | |
| | | SETTING TEMPERATURE TO 25 DEGREES | |

FIG. 19

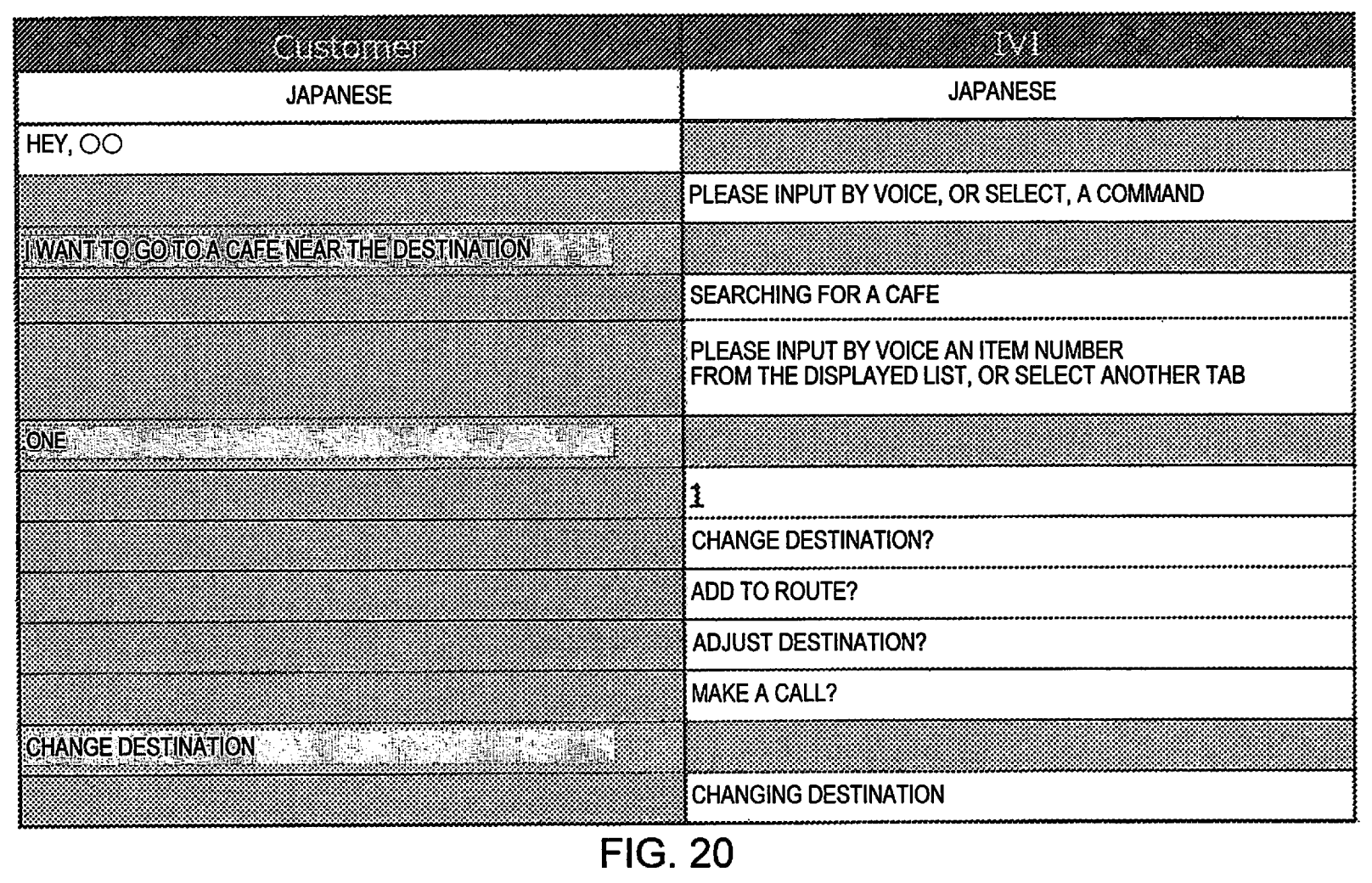

| Customer | | VI | |
|---|---|---|---|
| JAPANESE | | JAPANESE | |
| HEY, OO | | | |
| | | PLEASE INPUT BY VOICE, OR SELECT, A COMMAND | |
| I WANT TO GO TO A CAFE NEAR THE DESTINATION | | | |
| | | SEARCHING FOR A CAFE | |
| | | PLEASE INPUT BY VOICE AN ITEM NUMBER FROM THE DISPLAYED LIST, OR SELECT ANOTHER TAB | |
| ONE | | | |
| | | 1 | |
| | | CHANGE DESTINATION? | |
| | | ADD TO ROUTE? | |
| | | ADJUST DESTINATION? | |
| | | MAKE A CALL? | |
| CHANGE DESTINATION | | | |
| | | CHANGING DESTINATION | |

FIG. 20

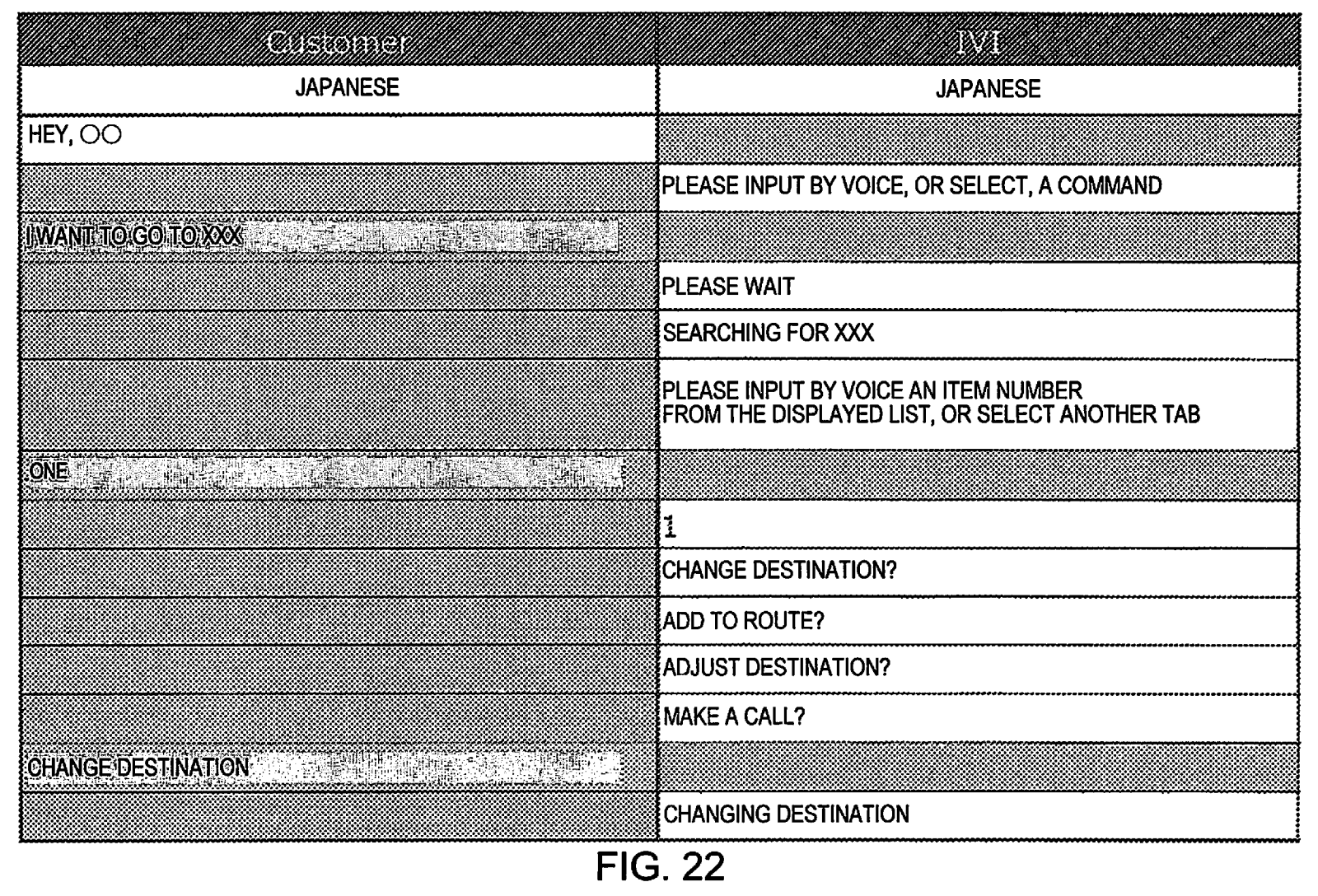

| @ listener | IVI |
|---|---|
| JAPANESE | JAPANESE |
| HEY, ○○ | |
| | PLEASE INPUT BY VOICE, OR SELECT, A COMMAND |
| I WANT TO GO TO XXX | |
| | PLEASE WAIT |
| | SEARCHING FOR XXX |
| | PLEASE INPUT BY VOICE AN ITEM NUMBER FROM THE DISPLAYED LIST, OR SELECT ANOTHER TAB |
| ONE | |
| | 1 |
| | CHANGE DESTINATION? |
| | ADD TO ROUTE? |
| | ADJUST DESTINATION? |
| | MAKE A CALL? |
| CHANGE DESTINATION | |
| | CHANGING DESTINATION |

FIG. 22

| Customer | M |
|---|---|
| JAPANESE | JAPANESE |
| HEY, OO | |
| PLAY PLAYLIST "DRIVE MUSIC" | PLEASE INPUT BY VOICE, OR SELECT, A COMMAND |

FIG. 23

| Customer | IVI |
|---|---|
| JAPANESE | JAPANESE |
| HEY, ○○ | |
| | PLEASE INPUT BY VOICE, OR SELECT, A COMMAND |
| SEND AN SMS TO ○○○ | |
| | WHAT MESSAGE SHALL I SEND? |
| MESSAGE | |
| XXXXX | |
| | SEND THE TEXT XXXXX TO ○○ |

FIG. 24

| Customer | IVI |
|---|---|
| JAPANESE | JAPANESE |
| | A MESSAGE HAS ARRIVED FROM ○○○ |
| | PLEASE INPUT BY VOICE, OR SELECT, A COMMAND |
| READ SMS ALOUD | |
| | XXXXXX |
| REPLY | |
| | WHAT MESSAGE SHALL I SEND? |
| XXXXX | |
| | SEND THE TEXT XXXXX TO ○○ |

HEY ○○

FIG. 25

DISPLAY CONTROL DEVICE AND DISPLAY CONTROL METHOD

CROSS-REFERENCE TO RELATED APPLICATIONS

This application is a U.S. national stage application of International Application No. PCT/JP2021/021239, filed on Jun. 3, 2021.

BACKGROUND

Technical Field

The present invention relates to a display control device and a display control method.

Background Information

An agent device that provides a service, including replies in response to an utterance by an occupant of a vehicle, is known (for example, Patent Document 1—Japanese Laid-Open Patent Application No. 2020-144274). This agent device recognizes a command included in the utterance of the occupant, outputs the recognized command to a plurality of agent function units, and selects, based on the results from each of the plurality of agent function units, the agent function unit from among the plurality of agent function units that responds to the occupant's utterance.

SUMMARY

However, in the conventional agent device described above, an agent function unit is selected based on a command included in the content of an utterance, so that there is the problem that operability will be poor for users who do not know what type of commands to include in the content of an utterance.

The problem to be solved by the present invention is to provide a display control device and a display control method with improved operability.

The present invention solves the problem described above by causing a display to display a main screen including an operating state image indicating an operating state of a dialogue system, causing the display to display a category screen including a category image in which commands are grouped when voice processing is not completed normally, and changing the display screen from the category screen to another screen when a category is selected in a state in which the category screen is displayed.

By using the present invention, the display screen of the display changes in accordance with the result of the voice recognition process, and the display screen of the display also changes when the voice recognition process does not progress normally, so that the operability can be improved.

BRIEF DESCRIPTION OF THE DRAWINGS

Referring now to the attached drawings which form a part of this original disclosure.

FIG. 3A is a table for explaining the relationship between wake-up words and steering switch operations, and switching activation between dialogue systems.

FIG. 3B is a table for explaining the relationship between wake-up words and steering switch operations, and switching activation between dialogue systems according to a modified example.

FIG. 19 is a table showing a model flow of a dialogue in the dialogue system of FIG. 1.

FIG. 20 is a table showing a model flow of a dialogue in the dialogue system of FIG. 1.

FIG. 22 is a table showing a model flow of a dialogue in the dialogue system of FIG. 1.

FIG. 23 is a table showing a model flow of a dialogue in the dialogue system of FIG. 1.

FIG. 24 is a table showing a model flow of a dialogue in the dialogue system of FIG. 1.

FIG. 25 is a table showing a model flow of a dialogue in the dialogue system of FIG. 1.

DETAILED DESCRIPTION OF EMBODIMENTS

Figure 1:
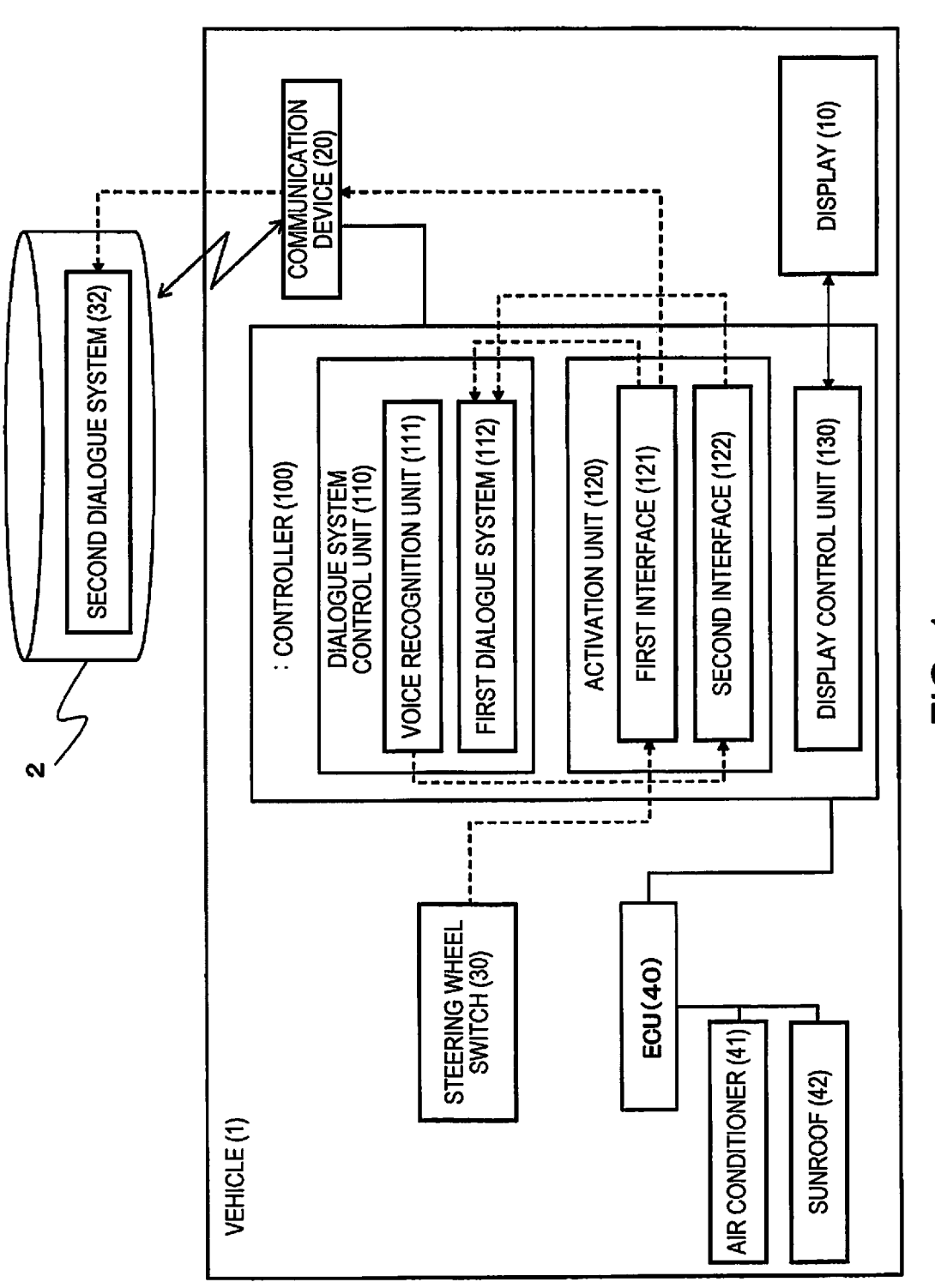
FIG. 1 is a block diagram showing a dialogue service system according to an embodiment of the present invention.

An embodiment of a dialogue service system according to the present invention will be described below with reference to the drawings. FIG. 1 is a block diagram showing a dialogue service system according to an embodiment of the present invention. The dialogue service system is a system installed in a vehicle and comprises a display 10, a communication device 20, a steering wheel switch 30, an ECU 40, and a controller 100. The dialogue service system according to the present embodiment includes a system that uses voice processing functions to interact with occupants in order to provide service to the occupants, and a system for controlling a display screen of the display.

Figure 2:
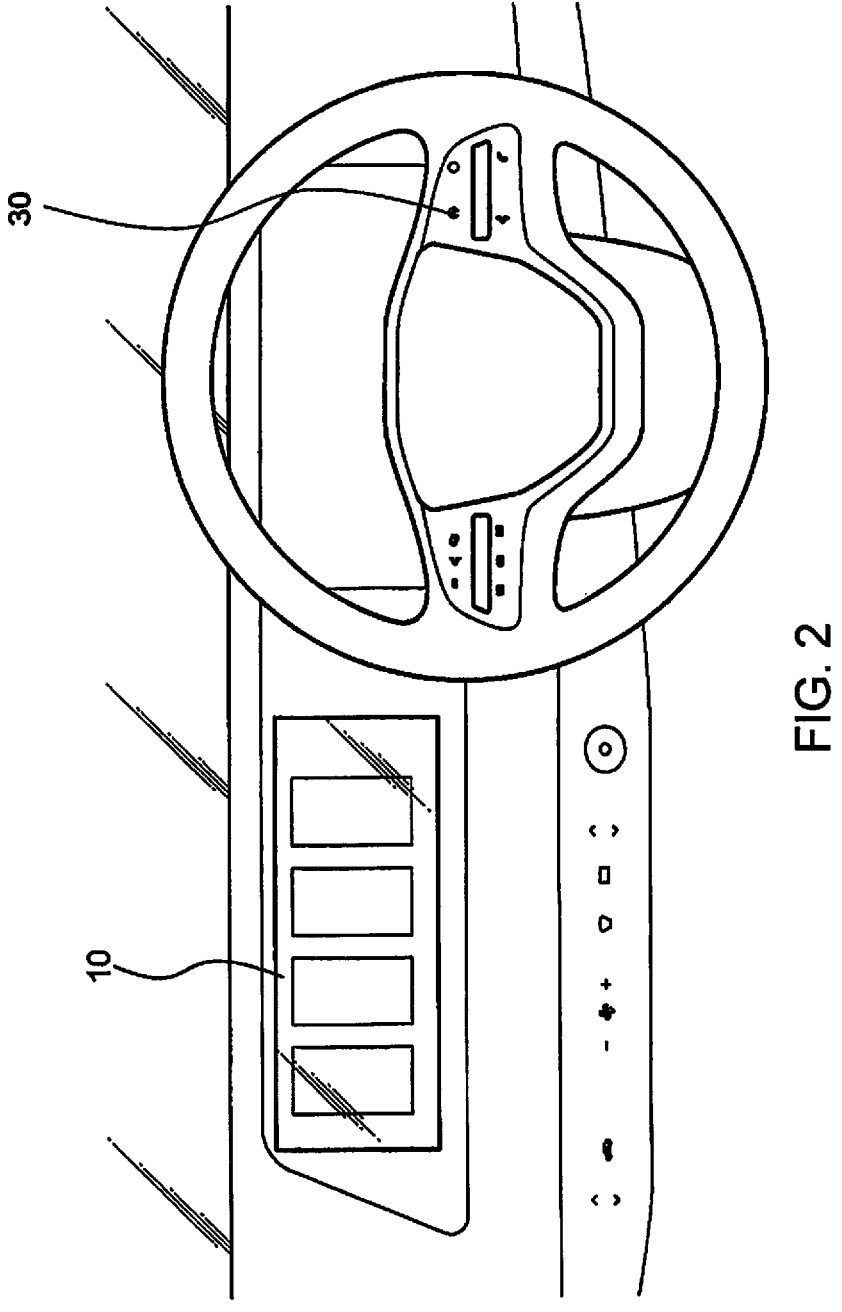
FIG. 2 is a front view of a dashboard equipped with the display of FIG. 1.

The display 10 is a touch panel display, which is mounted in a vehicle. The touch panel display 10 has a pressure-sensitive sensor and measures the pressing force applied to the display 10 at the time of a touch operation, thereby detecting a touch operation carried out by an occupant. The mechanism of the pressure-sensitive sensor is not particularly limited, and any method known at the time of filing may be appropriately used. The touch panel is not limited to a pressure-sensitive type and may be another type such as a capacitive type. FIG. 2 is a front view of the vicinity of a dashboard equipped with a touch panel. As shown in FIG. 2, the display 10 is a display (center display) in the front portion of the dashboard and is disposed between the driver's seat and the passenger's seat. The display 10 is provided in a position that can be touched by both an occupant sitting in the driver's seat and an occupant sitting in the passenger's seat. In addition, the display 10 need not necessarily be disposed in a position that can be touched by both the driver and the occupant of the passenger's seat, and may be disposed in a position that can be touched only by the driver. Additionally, the display 10 is not limited to the dashboard and may be disposed in a position that can be touched by an occupant of the rear seat.

When an occupant uses a finger or an operating device instead of a finger to select an icon, a button, or the like, from a menu screen by means of touch operation that touches the display 10, the display screen of the display 10 transitions. The following description primarily describes a touch operation using a finger, but a touch operation using an operating device instead of a finger is also possible in the present embodiment. A touch operation is a pointing operation performed with a gesture using a finger, such as bringing a finger close to or in contact with an icon or a button displayed on the display 10. Examples of touch operations include tapping (touching the screen once), double tapping (touching the screen twice), long tapping (pressing down on the screen), swiping (sliding (tracing) a finger against the screen), flicking (making a quick flipping movement of the finger against the screen), pinch in/pinch out (touching the screen with two fingers and moving the two fingers closer together/away from each other), etc. Touch operations are not limited to a first gesture in which a finger touches one or more points on a screen, and may include a second gesture in which the contact point of the finger is moved against the screen. In addition, the touch operation need not be one of direct contact with the display screen but also be a so-called hovering, in which a finger, or the like, is brought close to the display screen. The operation method of the touch operation is not limited to the foregoing and other methods may be employed.

The communication device 20 is capable of communication with a server 2 outside of the vehicle. The communication device 20 sends and receives signals between the controller 100 and the server 2. The steering wheel switch (steering switch) 30 is a switch for starting (activating) the dialogue system and is provided on the steering wheel as shown in FIG. 2. When the occupant (driver) wishes to receive a service through the dialogue system, he/she operates the steering wheel switch 30 in order to activate the dialogue system. As described further below, the dialogue system includes a first dialogue system 112 that mainly uses a voice recognition engine provided in the vehicle 1 to carry out voice processing, thereby providing service, and a second dialogue system 32 that mainly uses a voice recognition engine included in the server 2 to carry out voice processing, thereby providing service from the server 2 to the occupant. The steering wheel switch 30 is then assigned to activate one of the dialogue systems, and by means of operation of the steering wheel switch 30, either the first dialogue system or the second dialogue system is activated.

The ECU 40 is a control unit that controls a control target, such as an air conditioner 41 and a sunroof 42, and controls the controller 100 and the control target by means of a CAN communication network. The ECU 40 is not limited to one control unit, but is made up of a plurality of control units, and the ECU 40 is connected to each control target.

The controller 100 is composed of a computer provided with hardware and software, and has a memory unit in which a program is stored, a CPU that executes the program stored in the memory, and the like. In addition, the controller 100 has, as function blocks, a dialogue system control unit 110, an activation unit 120, and a display control unit 130, and a program for realizing each function of the dialogue system control unit 110, the activation unit 120, and the display control unit 130 is stored in the memory. Then, the computer included in the controller 100 executes the program in order to realize each function of the function blocks. In addition, the controller 100 is connected to the display 10, the communication device 20, the steering wheel switch 30, and the ECU 40 by the CAN communication network, or the like. The controller 100 is not limited to the dialogue system control unit 110, the activation unit 120, and the display control unit 130, and has control blocks for controlling various systems in the vehicle cabin, such as a function for controlling an audio system, for example, and controls other in-vehicle devices. A device having the controller 100 corresponds to the "display control device" of the present invention.

The dialogue system control unit 110 has a function for recognizing the occupant's voice and controls the dialogue system. The dialogue system control unit 110 includes a voice recognition unit 111 and the first dialogue system 112. The voice recognition unit 111 detects the occupant's voice input and uses the voice recognition engine included in the first dialogue system 112 in order to recognize voice by voice processing of the detected voice. In a state in which the first dialogue system 112 is activated, when the occupant speaks into a microphone inside the vehicle, the voice recognition unit 111 detects the input voice. Voice detection is executed from the start of voice input until a prescribed period of time has elapsed after the voice input ends. For example, if the occupant speaks a message such as "set the temperature of the AC (air conditioner) to 25° C.," the voice recognition unit 111 detects voice from beginning to end of the message, and ends the voice detection after a prescribed period of silence has elapsed after the end of the message. The voice recognition unit 111 performs voice processing of the detected voice using the voice recognition engine in order to recognize the voice.

In addition, when a wake-up word for activating the dialogue system is recognized, the voice recognition unit 111 outputs to a second interface 122, described below, a control signal indicating that a wake-up word has been recognized. A wake-up word is a message of address, such as "Hello ○○ (name of car manufacturer, nickname of the dialogue system, etc.)" and is set in advance. The wake-up word may be changed by the occupant's setting.

The first dialogue system 112 is an in-vehicle voice processing system, the primary purpose of which is cooperation with in-vehicle devices, wherein this system uses the voice recognition engine to create a dialogue between an occupant and the controller 100 in order to provide the occupant with a service corresponding to the content of the interaction. The first dialogue system 112 is connected to the ECU 40 in order to cause in-vehicle devices, such as the air conditioner 41, the sunroof 42, a navigation system, an audio system, a hands-free system, and the like, to cooperate with each other. The first dialogue system 112 has a communication function to communicate with each ECU. For example, if the occupant tells the dialogue system to change the temperature setting of the air conditioner 41, the voice recognition unit 111 carries out voice processing and identifies the air conditioner 41 as the control target based on the voice data recognized by the voice recognition unit 111 in order to generate a control command and outputs the control command to the ECU 40 via an in-vehicle communication path (CAN communication network). When a control signal is sent from the first dialogue system 112 to an in-vehicle device such as an air conditioner 41 via the ECU 40, the in-vehicle communication path through which the control signal passes does not include the communication path that connects the controller 100 and the communication device 20. The ECU 40 controls the air conditioner 41 in accordance with the control command in order to change the set-point temperature of the air conditioner 41. The first dialogue system 112 thereby provides service to the occupant through dialogue. Services provided by the first dialogue system 112 are not limited to setting the air conditioner 41 and may also include airflow direction adjustment, air volume adjustment, etc., of the air conditioner 41. Other examples of services include operations of in-vehicle devices, such as route guidance by a navigation system, audio system settings, operation of the telephone and telephone number searches by means of a hands-free system, short message service (SMS), and the opening/closing of the sunroof 42, windows, rear doors, sliding doors, and the like.

On the other hand, the second dialogue system 32 included in the server 2 is a system that uses an external voice recognition engine in order to carry out voice processing, and the vehicle 1 connects to the server 2 to access external information in order to provide services to occupants. The services provided by the second dialogue system 32 are diverse, such as Internet-based shopping, remote control of home appliances, etc. Unlike the first dialogue system 112, the second dialogue system 32 is not intended for cooperation with in-vehicle devices. Moreover, in regard to the difference between the first dialogue system 112 and the second dialogue system 32, the first dialogue system and the second dialogue system are separate dialogue systems, wherein the first dialogue system has a voice recognition engine (corresponding to the "first voice recognition engine" of the present invention) that transmits control commands to in-vehicle devices via the in-vehicle communication path, whereas the second dialogue system has a different voice recognition engine (corresponding to the "second voice recognition engine" of the present invention) than the voice recognition engine included in the first dialogue system. From another perspective, the difference between the first dialogue system 112 and the second dialogue system 32 is that the first dialogue system 112 inputs or outputs control commands to/from in-vehicle devices via an in-vehicle communication path, whereas the second dialogue system 32 is a system that does not input or output control commands to/from in-vehicle devices via an in-vehicle communication path, other than the communication device 20. From yet another perspective, the difference between the first dialogue system 112 and the second dialogue system 32 is that the first dialogue system 112 may be a system that outputs control commands to the in-vehicle devices via an in-vehicle communication path other than the communication path connecting the communication device 20 and the first dialogue system 112, and that does not output control commands via an in-vehicle communication path other than the communication path connecting the communication device 20 and the first dialogue system 112.

During interaction with an occupant using the second dialogue system 32, the voice recognition unit 111 detects a voice input from the occupant and outputs the detected voice data to the server 2 via the communication device 20. The second dialogue system 32 of the server 2 voice-processes the input voice data and outputs the processing result to the vehicle 1. The voice recognition unit 111 outputs the processing result of the second dialogue system 32 by means of a display screen of the display 10, or by means of voice output from an in-vehicle speaker.

Not limited to the in-vehicle ECU 40, the first dialogue system 112 may connect to the server 2 outside of the vehicle. For example, the first dialogue system 112 may connect to the server 2 outside of the vehicle and use a voice recognition engine outside of the vehicle in order to carry out the voice recognition process. For example, because there is a large amount of information, such as the names of stores, there are cases in which it is better to use an external voice recognition engine than an in-vehicle voice recognition engine. In such cases, the first dialogue system 112 uses a voice recognition engine outside of the vehicle to carry out the voice recognition process.

The activation unit 120 is a function block for activating the first dialogue system 112 and the second dialogue system 32 and has a first interface 121 and the second interface 122. The first interface 121 outputs an activation command to the dialogue system by an operation of the steering wheel switch 30, that is, the first interface 121 serves as a connection unit that connects the steering wheel switch 30 and the first dialogue system 112, as well as the steering wheel switch 30 and the second dialogue system 32. The first interface 121 outputs an activation command to one of either the first dialogue system 112 or the second dialogue system 32. The first interface 121 never outputs a control command to both the first dialogue system 112 and the second dialogue system 32 simultaneously. The transmission destination for the control command sent by the first interface 121 is determined as an occupant's setting and/or a factory default setting. If the steering wheel switch 30 is assigned to activate the first dialogue system 112, the first interface 121 outputs an activation command to the first dialogue system 112 when receiving an operation command by means of an operation of the steering wheel switch 30. If the steering wheel switch 30 is assigned to activate the second dialogue system 32, the second interface 122 outputs an activation command to the second dialogue system 32. The activation command for the second dialogue system 32 brings about a state in which communication between the vehicle 1 and the server 2 can take place, thereby allowing the vehicle 1 to use the dialogue system of the server 2.

The second interface 122 outputs an activation command to the dialogue system by means of a wake-up word. The second interface 122 is a connection unit between the voice recognition unit 111 and the dialogue system. The second interface 122 outputs an activation command to one of either the first dialogue system 112 or the second dialogue system 32. The second interface 122 never outputs a control command to both the first dialogue system 112 and the second dialogue system 32 simultaneously. In the example of FIG. 1, the second interface 122 outputs an activation command to the first dialogue system 112. The transmission destination for the control command sent by the second interface 122 is determined by a factory default setting. In the example of FIG. 1, the wake-up word is assigned to activate the first dialogue system 112; thus, when the voice recognition unit 111 recognizes the wake-up word, the second interface 122 outputs an activation command to the first dialogue system 112. That is, the voice recognition engine included in the first dialogue system 112 stands by in a state in which at least the wake-up word can be recognized, and when the voice recognition unit 111 recognizes the wake-up word, the second interface 122 outputs an activation command to the first dialogue system 112, and the first dialogue system 112 activates the voice recognition engine so as to be able to recognize various words other than the wake-up word. If the wake-up word is assigned to activate the second dialogue system 32, the second interface 122 outputs an activation command to the second dialogue system 32.

Additionally, the activation unit 120 sets the transmission destination of the activation command to one of either the first dialogue system 112 or the second dialogue system 32 based on the occupant's operation. The occupant's operation for setting the transmission destination of the activation command includes a touch operation of the display 10, the operation of a switch other than the steering wheel switch 30, or the like. For example, in the example of a touch operation of the display 10, the controller 100 displays a settings screen of the dialogue system on the display 10, and the occupant touches a selection menu on the displayed settings screen to select one of either the first dialogue system 112 or the second dialogue system 32 in order to select the dialogue system on the selection menu that the occupant wishes to use. The activation unit 120 sets a transmission destination for an activation signal of the first interface 121 to output the activation signal to the dialogue system selected by means of the touch operation to the display 10. For example, if, when operating the steering wheel switch 30, the occupant touches the display 10 and changes the target system to be activated from the first dialogue system 112 to the second dialogue system 32, the activation unit 120 sets the transmission destination for the activation signal from the first interface 121 to the second dialogue system 32. The occupant can thus select the preferred dialogue system to be activated from the first dialogue system 112 and the second dialogue system 32 through an operation of the steering wheel switch 30.

In addition, if the dialogue system setting can be changed by means of interaction with the occupant using the dialogue system, the activation unit 120 may set the transmission destination of activation commands from the first interface 121 to one of either the first dialogue system 112 or the second dialogue system 32 based on voice recognized by the dialogue system control unit 110. For example, suppose that the occupant is interacting with the controller 100 through the first dialogue system 112 and indicates that he/she wishes to change the assignment of the steering wheel switch 30 from the first dialogue system 112 to the second dialogue system 32. The dialogue system control unit 110 recognizes the occupant's voice and outputs a control command to the activation unit 120 for assigning the steering wheel switch 30 to the activation of the second dialogue system 32. The activation unit 120 sets the transmission destination for activation signals from the first interface 121 to the second dialogue system 32 based on the control command. Thus, by operating the steering wheel switch 30, the occupant can select the target system to be activated from the first dialogue system 112 or the second dialogue system 32 by means of an interaction using the dialogue system.

In the present embodiment, in the dialogue system that can be activated by operating the steering wheel switch 30, the user can select between either the first dialogue system 112 or the second dialogue system 32, but the dialogue system that can be activated by a wake-up word is fixed to the first dialogue system 112. The first dialogue system 112 is used mainly for the purpose of cooperation with in-vehicle devices and is more frequently used than the second dialogue system 32. Thus, by fixing the activation by means of the wake-up word to the first dialogue system 112, it is possible to enhance occupant convenience. In addition, because the assignment of the steering wheel switch 30 can be determined by the occupant, some measure of freedom in selecting the dialogue system can be ensured.

FIG. 3A is a table for explaining whether it is possible to switch between activation of the first and second dialogue systems. As shown in FIG. 3A, in the dialogue service system according to the present embodiment, the "wake-up word" can activate the first dialogue system 112 but not the second dialogue system 32. The "steering wheel switch" can activate one of either the first dialogue system 112 or the second dialogue system 32, in accordance with the occupant's setting. That is, the activation of a dialogue system can be selected in a mutually exclusive manner by means of the steering wheel switch 30. If the steering wheel switch 30 is assigned to the first dialogue system 112, the second dialogue system 32 cannot be activated by means of the wake-up word or an operation of the steering wheel switch 30, but the second dialogue system 32 can be activated by means of selection on a menu screen displayed on the display 10 or by means of an operation of a switch other than the steering wheel switch 30, for example.

FIG. 3B is a table for explaining the correlation between the first and second dialogue systems and activation in the dialogue service system according to a modified example of the present embodiment. In the dialogue service system according to the modified example, the dialogue system that can be activated by the wake-up word can be selected by means of a user setting in a mutually exclusive manner. When the wake-up word is recognized, the activation unit 120 sets the transmission destination of the activation command to one of either the first dialogue system 112 or the second dialogue system 32. The occupant can select the dialogue system to be activated from either the first dialogue system 112 or the second dialogue system 32 by means of a touch operation of the display 10, the operation of a switch other than the steering wheel switch 30, or by interacting with the controller 100 using the dialogue system. As a result, it is possible to avoid a situation in which more than one dialogue system is activated when the wake-up word is uttered, and to select the dialogue system to be activated when the steering wheel switch 30 is operated from either the first dialogue system 112 or the second dialogue system 32, in accordance with the user's preference.

In addition, the dialogue system may have a proprietary standard relating to the activation of the system. An example of a proprietary standard is "in a state in which a specific dialogue system can be activated, other dialogue systems must be turned off (disabled)," or the like. When a dialogue system with such a standard for the first dialogue system 112 is used, it should be configured such that a user setting can change the assignment of the steering wheel switch 30 or select a dialogue system in a mutually exclusive manner, as in the present embodiment. In addition, when the dialogue system to be activated by the wake-up word is made user-configurable, it should be configured such that a user setting can change the assignment of what is to be activated by the wake-up word, or such that the user setting can select a dialogue system in a mutually exclusive manner, as in the modified example. That is, due to the standard of the first dialogue system, it is necessary to activate the first dialogue system 112 or the second dialogue system 32 in a mutually exclusive manner. Thus, it is possible to ensure some measure of freedom when the dialogue system is selected while complying with the standards of the dialogue system by making the assignment of the steering wheel switch 30 and the assignment of what is to be activated by the wake-up word user-configurable.

In the present embodiment, if the transmission destination of the activation command from the first interface 121 and/or the second interface 122 is changed by an operation of the occupant or by an interaction with the occupant using the dialogue system, the dialogue system control unit 110 may output the content of the change to the occupant by voice.

The display control unit 130 controls the display screen of the display 10. In addition, when detecting a touch operation on the display, the display control unit 130 receives an operation command corresponding to the type of the touch operation and the position of the touch operation on the display screen. The display control unit 130 displays on the display 10 an operation screen for operating the dialogue system, a settings screen of the dialogue system, a screen that displays information provided by the dialogue system, and the like. In addition, the display control unit 130 outputs the operation command received by means of the touch operation on the display 10 to the dialogue system control unit 110 and the activation unit 120.

Control of the dialogue system by the dialogue system control unit 110 and control of the display screen by the display control unit 130 are associated with each other by means of an application (software). The operating state of the dialogue system by the dialogue system control unit 110 is displayed on the display 10. The display control unit 130 controls the display screen of the display 10 in accordance with the interactions of the dialogue system. When the occupant interacts with the controller 100 via the dialogue system, the dialogue system control unit 110 outputs a control command corresponding to the content of the interaction to the display control unit 130, and the display control unit 130 causes the display screen of the display 10 to transition in accordance with the control command.

Figure 4:
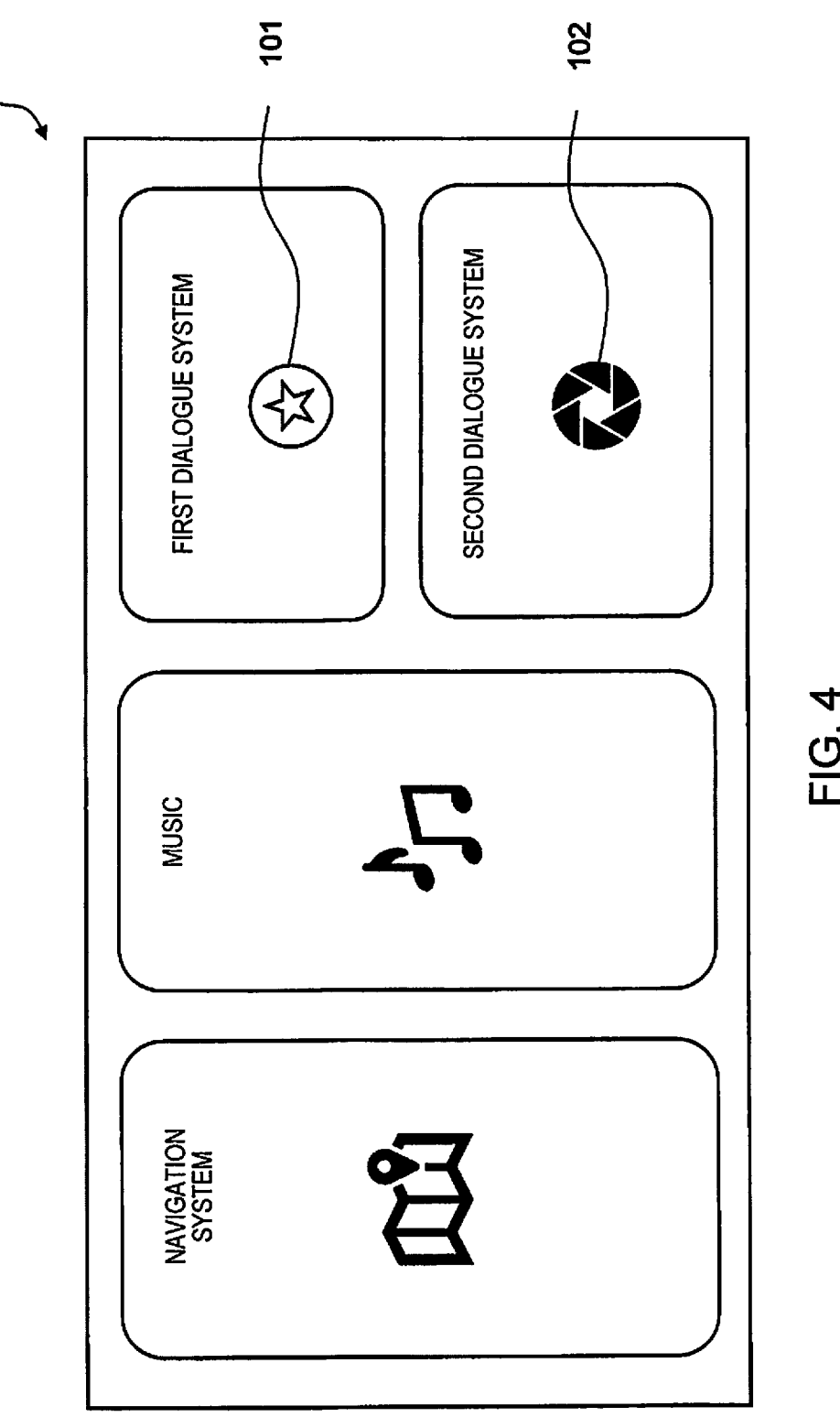
FIG. 4 is a diagram showing a display screen of the display of FIG. 1.

A method for controlling the controller 100 and display screens of the display 10 will now be described with reference to FIG. 4. FIG. 4 is a display screen of the display 10, showing the home screen of the entire system, including the dialogue service system.

When the occupant turns on the main switch to the display 10, the display control unit 130 displays the home screen on the display 10. As shown in FIG. 4, the home screen is a menu screen for selecting the navigation system, music, the first dialogue system 112, or the second dialogue system 32. Each menu screen includes an icon representing the contents; for example, the menu image of the first dialogue system 112 includes a first icon 101, and the menu image of the second dialogue system 32 includes a second icon 102. The first icon 101 enables touch operation for activating the first dialogue system 112, and the second icon 102 enables touch operation for activating the second dialogue system 32. If the occupant touches the first icon 101, the activation unit 120 outputs an activation signal to the first dialogue system 112. If the occupant touches the second icon 102, the activation unit 120 outputs an activation signal to the second dialogue system 32. As a result, the first dialogue system 112 or the second dialogue system 32 can be selected in a mutually exclusive manner by means of a touch operation of the display 10.

Display screens that are displayed in accordance with the operating state of the first dialogue system 112 will now be described. FIGS. 5-8 show display screens that are displayed on the display 10 for each operating state of the first dialogue system 112. When the occupant touches the first icon 101 or the area around the first icon 101 displayed on the home screen shown in FIG. 4, the display control unit 130 displays the screen shown in FIG. 5. There are four operating states of the first dialogue system 112: an "initial state," a "voice-reception ready state," a "voice-detecting state," and a "voice processing state." The initial state is the state from the time that the voice recognition engine is activated based on an activation signal until the time that voice detection becomes possible. In the initial state, the voice recognition unit 111 carries out an initialization process that is performed before voice processing occurs. When the initialization process is completed, the operating state of the first dialogue system 112 shifts from the initial state to the voice-reception ready state. In the voice-reception ready state, voice can be received but the occupant is not speaking. In the voice-detecting state, voice can be received, the occupant is speaking, and voice is being detected. That is, when voice is not being input during a state in which voice can be detected, the operating state of the first dialogue system 112 is the voice-reception ready state and when voice is being input, the operating state of the first dialogue system 112 is the voice-detecting state. Then, when the voice-detecting state ends and a prescribed period of time has elapsed, the operating state of the first dialogue system 112 becomes the voice processing state. In the voice processing state, voice processing is being executed by the voice recognition engine.

The display screens of FIGS. 5-8 show the main images of the service provided through the dialogue system and include operating state images indicating the operating states of the dialogue system. The operating state images indicate to the occupant the current state (status) of the dialogue system and correspond to text, animation, patterns, etc. In the present embodiment, a main message 50 and/or animation 70 correspond to operating state images.

Figure 5:
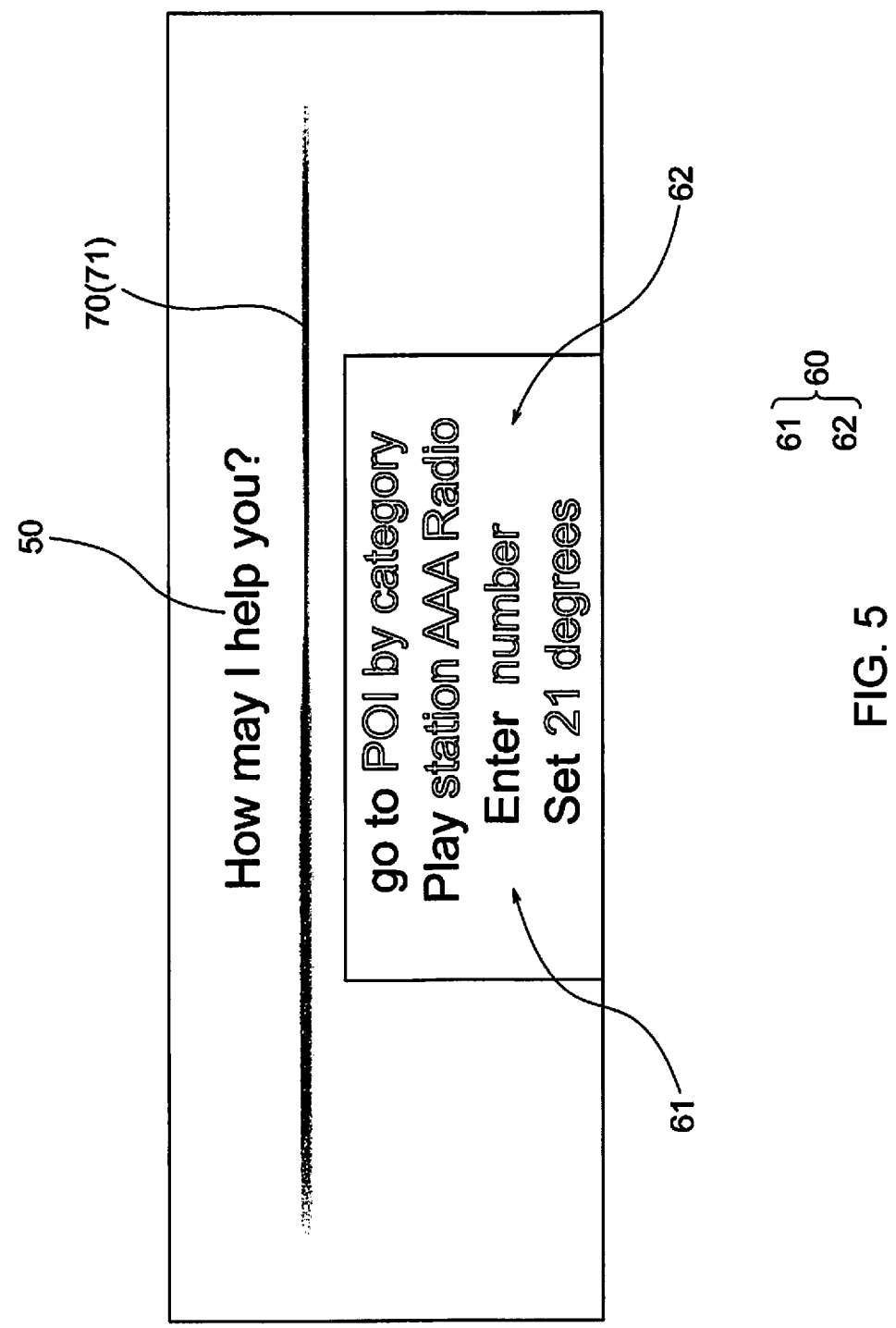
FIG. 5 is a diagram showing a display screen of the display of FIG. 1.

FIG. 5 shows the screen that is displayed on the display 10 when the operating state of the first dialogue system 112 is in the "initial state." As shown in FIG. 5, the display screen of the "initial state" includes the main message 50, a sample message 60, and animation 70. The main message 50 is a message from the first dialogue system 112 to the occupant and is a notice prompting the occupant to input voice. The occupant can check the main message 50, and thereby confirm that the dialogue system has been activated. That is, the main message 50 corresponds to an operating state image indicating that the dialogue system has been activated. The sample message 60 shows example sentences that the occupant should voice in order to use the first dialogue system 112, and includes a command 61 and a setting value 62. The command 61 is a word representing a state or an operation of the service that the occupant wishes to receive through the dialogue system and represents an operation command from the occupant to the dialogue system. The setting value 62 is a phrase representing the target of the service, and is represented by a numerical value or a noun, such as a name. For example, in the message "Play station AAA Radio" of the second line of the sample message 60, "Play" indicates a command and "station AAA Radio" indicates a setting value. The command "Play" indicates an operation of the audio system, and "station AAA Radio" indicates the target (name of a radio station) to be played by the audio system. The sample message 60 also serves as a function button and, for example, if the occupant touches the message "Enter Number" in the third row, the screen transitions to a screen for inputting a telephone number.

The animation 70 is an image representing the states of a prescribed function by means of cyclical movements. In the example of FIG. 5, the prescribed function corresponds to the voice-detection processing function of the dialogue system, and the status corresponds to the operating state of the dialogue system. The cyclical movement is represented by a movement of a waveform. That is, the animation 70 includes four animations 71-74 for representing the four operating states of the first dialogue system 112. That is, the progression of the voice processing carried out by the first dialogue system 112 is represented by the four animations 71-74. The animation 70 distinguishes each operating state such that the occupant seeing the animation can recognize the operating state from the shape, color, size, etc., of the wave. The controller 100 then operates the animation 70 in accordance with the occupant's voice input, and thereby displays the progression of the voice processing on the screen of the display 10. The animation 71 of FIG. 5 represents the "initial state." The animation 71 is a gray waveform of low amplitude. The animation 70 is displayed in a position between the main message 50 and the sample message 60. The operating state image indicating the operating state of the dialogue system need only include at least one of the main message 50 or the animation 70. Similarly, in the main screen shown in FIGS. 6-8 described further below, the operating state image need only include at least one of the main message 50 or the animation 70.

Figure 6:
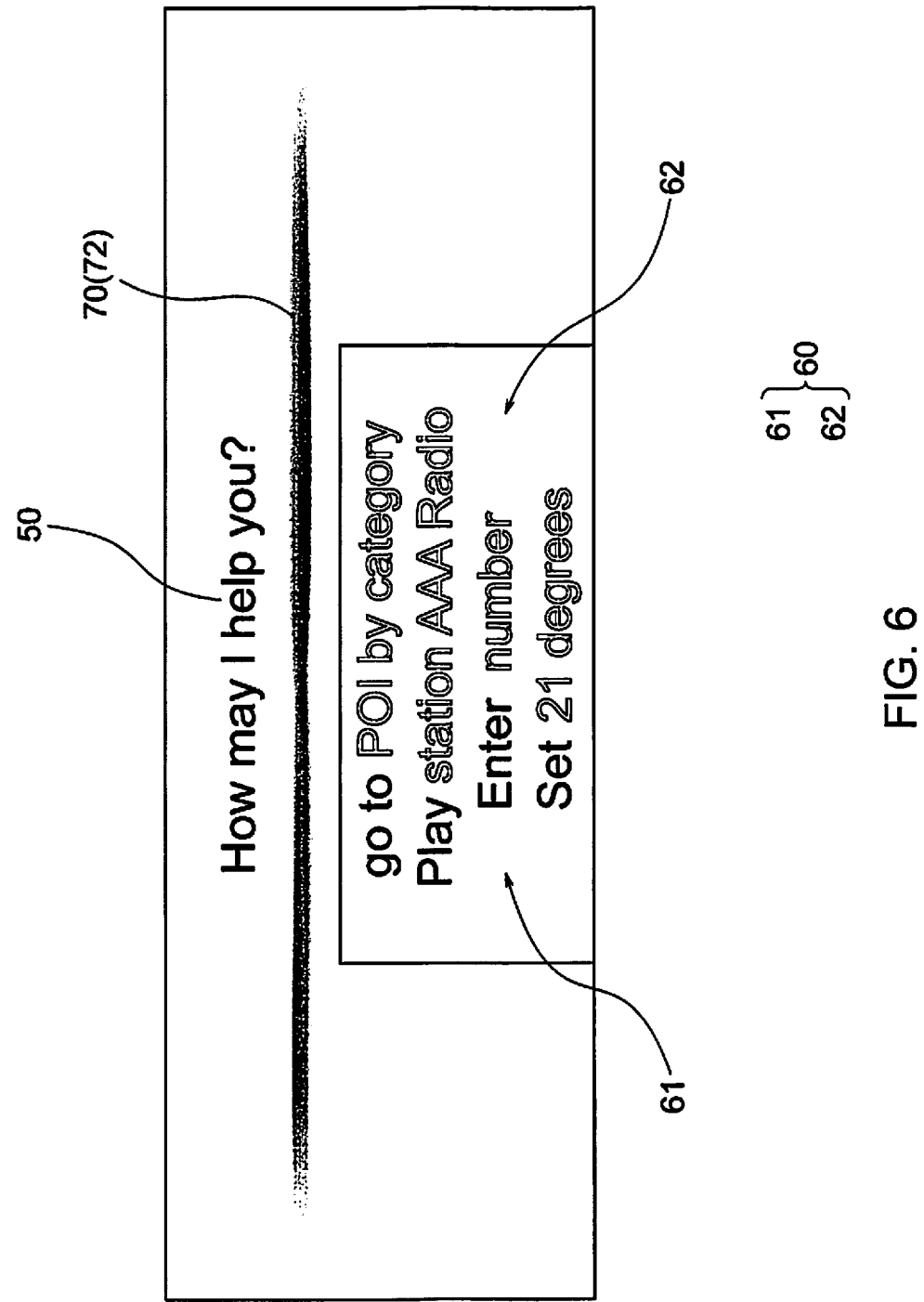
FIG. 6 is a diagram showing a display screen of the display of FIG. 1.

FIG. 6 shows the display screen that is displayed on the display 10 when the operating state of the first dialogue system 112 is the "voice-reception ready state." As shown in FIG. 6, the display screen of the "voice-reception ready state" includes the main message 50, the sample message 60, and the animation 70. The displayed positions and the displayed images of the main message 50 and the sample message 60 are the same as those in FIG. 5. The animation 72 of FIG. 6 represents the "voice-reception ready state." The animation 72 is a blue waveform, and the amplitude of the animation 72 is greater than the amplitude of the wave of the animation 71. If voice is detected while the "voice-reception ready state" is displayed, the display screen of the display 10 is switched to the screen of FIG. 7. If voice is not detected while the "voice-reception ready state" is displayed, the display screen of the display 10 remains in the state of FIG. 6.

Figure 7:
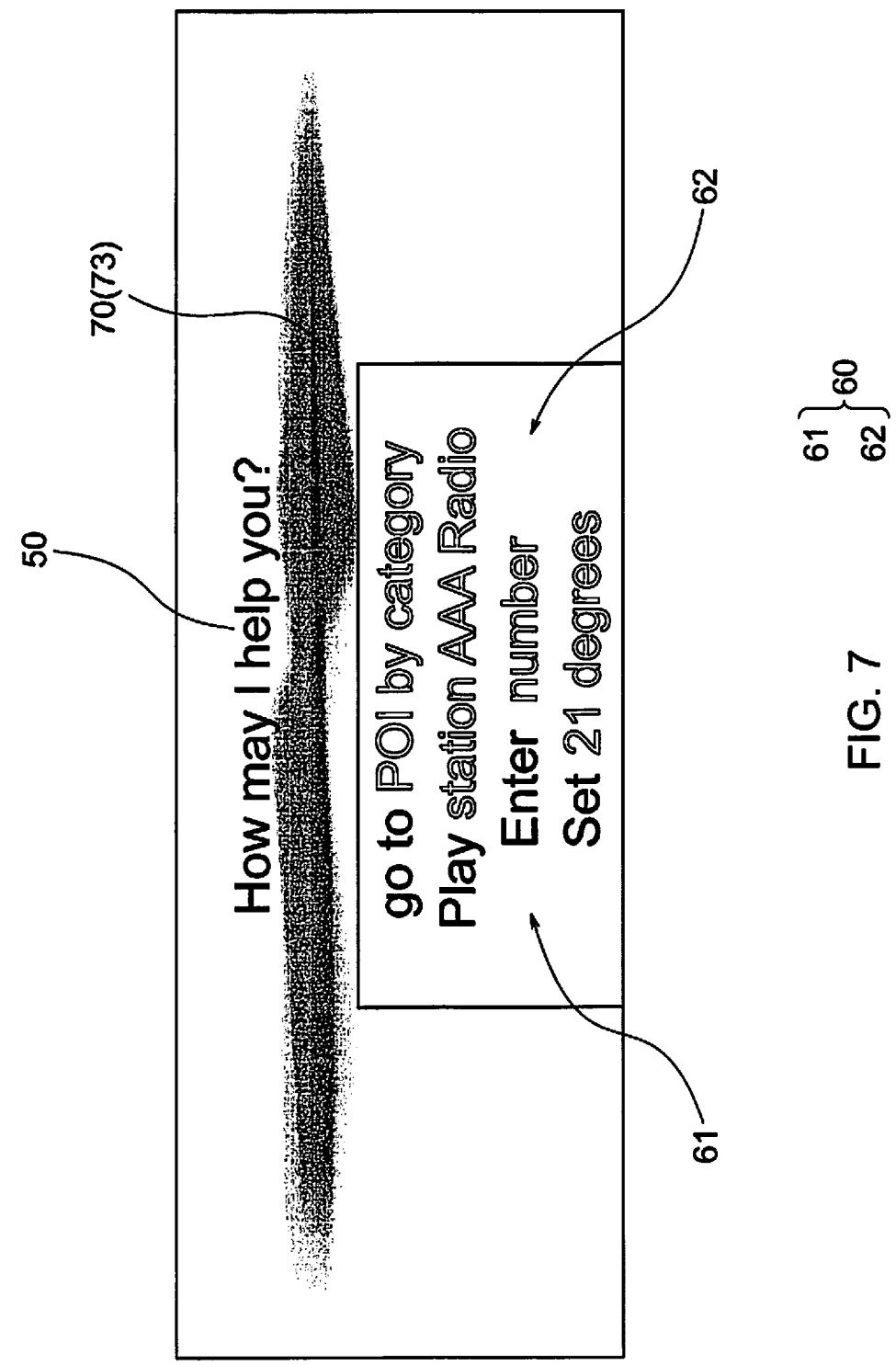
FIG. 7 is a diagram showing a display screen of the display of FIG. 1.

FIG. 7 shows the display screen that is displayed on the display 10 when the operating state of the first dialogue system 112 is the "voice-detecting state." As shown in FIG. 7, the display screen of the "voice-detecting state" includes the main message 50, the sample message 60, and the animation 70. The displayed positions and the displayed images of the main message 50 and the sample message 60 are the same as those in FIGS. 5 and 6. The animation 73 of FIG. 7 represents the "voice-detecting state." The animation 73 is a blue waveform and the amplitude of the wave of the animation 73 is greater than the amplitude of the wave of the animation 72. By making the amplitude of the wave of the animation 73 greater than the amplitude of the wave of the animation 72, the occupant can confirm from the display screen that voice has been detected.

The display control unit 130 may change the amplitude of the animation 73 in accordance with the volume of the detected voice. For example, the display control unit 130 controls the amplitude of the animation 73 in accordance with the voice input such that the amplitude of the animation 73 increases as the volume of the detected voice increases. The occupant may observe the movement of the amplitude of the animation 73 while speaking in order to confirm from the display screen that voice is detected by the voice recognition system. In addition, the animation 73 may be an animation in which a plurality of waves are superimposed to convey a sense of dynamic movement.

Figure 8:
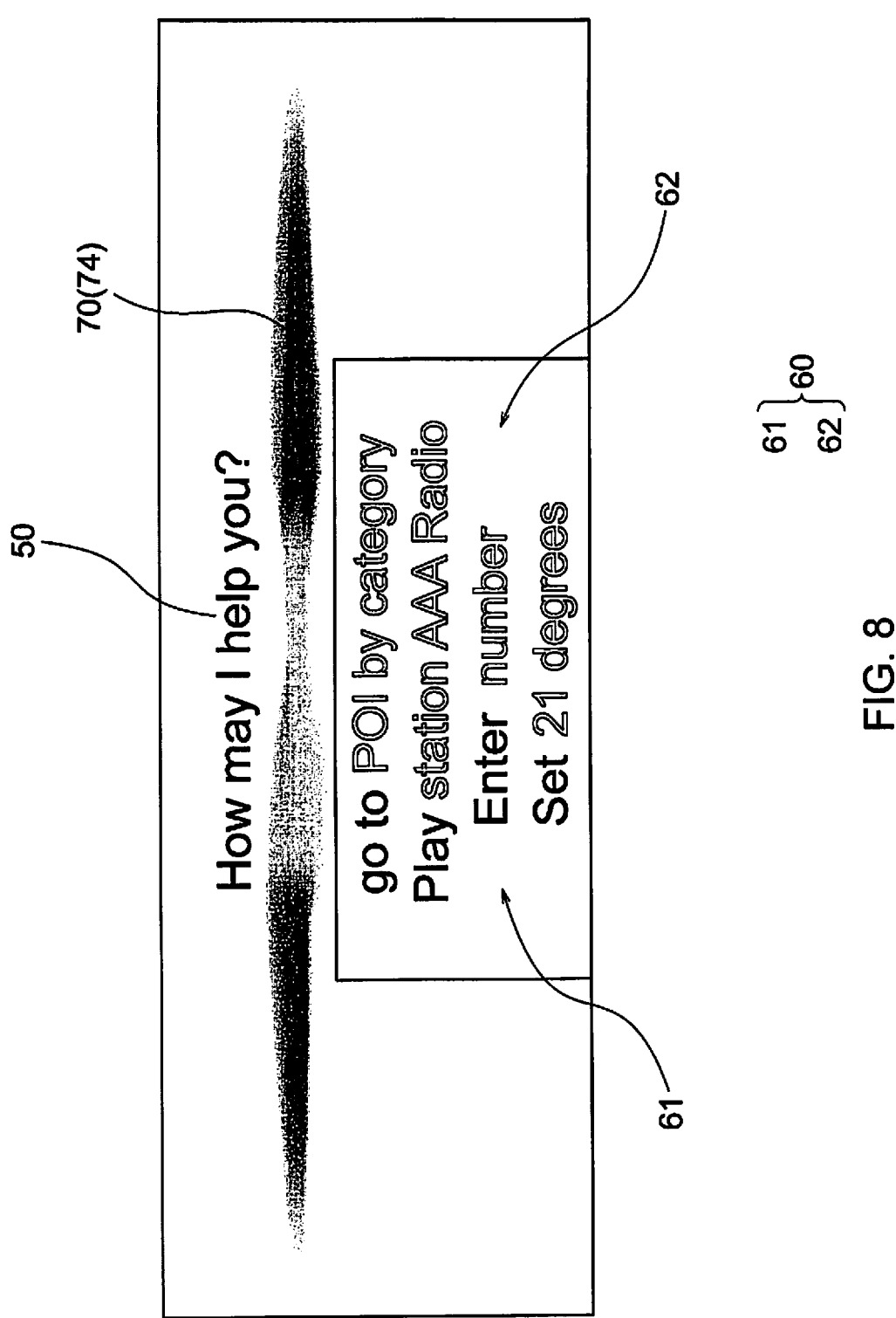
FIG. 8 is a diagram showing a display screen of the display of FIG. 1.

FIG. 8 shows the display screen that is displayed on the display 10 when the operating state of the first dialogue system 112 is the "voice processing state." As shown in FIG. 8, the display screen of the "voice processing state" includes the main message 50, the sample message 60, and the animation 70. The displayed positions and the displayed images of the main message 50 and the sample message 60 are the same as those in FIGS. 5 to 7. The animation 74 of FIG. 8 represents the "voice processing state." The animation 74 is a red, white, and green waveform, and the different areas of the wave are color-coded. For example, at a certain time, the animation 74 is displayed in the order of red, white, and green, from left to right, in FIG. 8. Then, the amplitude of the wave and the color-coded portions change over time. The amplitude of the animation 74 is smaller than the amplitude of the animation 73. The occupant can see that the color of the wave has changed from "blue" to "red/white/green," thereby confirming from the display screen that voice processing has started. The animation 74 may be an animation in which a plurality of waves are superimposed to convey a sense of dynamic movement. Not only the animation 74, but also the animations 71-73 may be formed by combining a plurality of superimposed waves.

In addition, the number of colors assigned to the animation 74 is three, which is greater than the number of colors assigned to the animations 71-73. The occupant can thus more clearly distinguish the "voice processing state" of the first dialogue system 112 from the other operating states of the first dialogue system 112 besides the "voice processing state" by the form of the display of the animation 70. In the present embodiment, there are four types of animations 70 in accordance with the operating states of the voice processing function, but the number of types of animations is not limited to four and may be two, three, or five or more types. In addition, the motion that is displayed by the animation is not limited to waves and may be conveyed by changes in pattern, changes in the height of a bar graph, etc., and only requires that the changes be cyclical.

Figure 9:
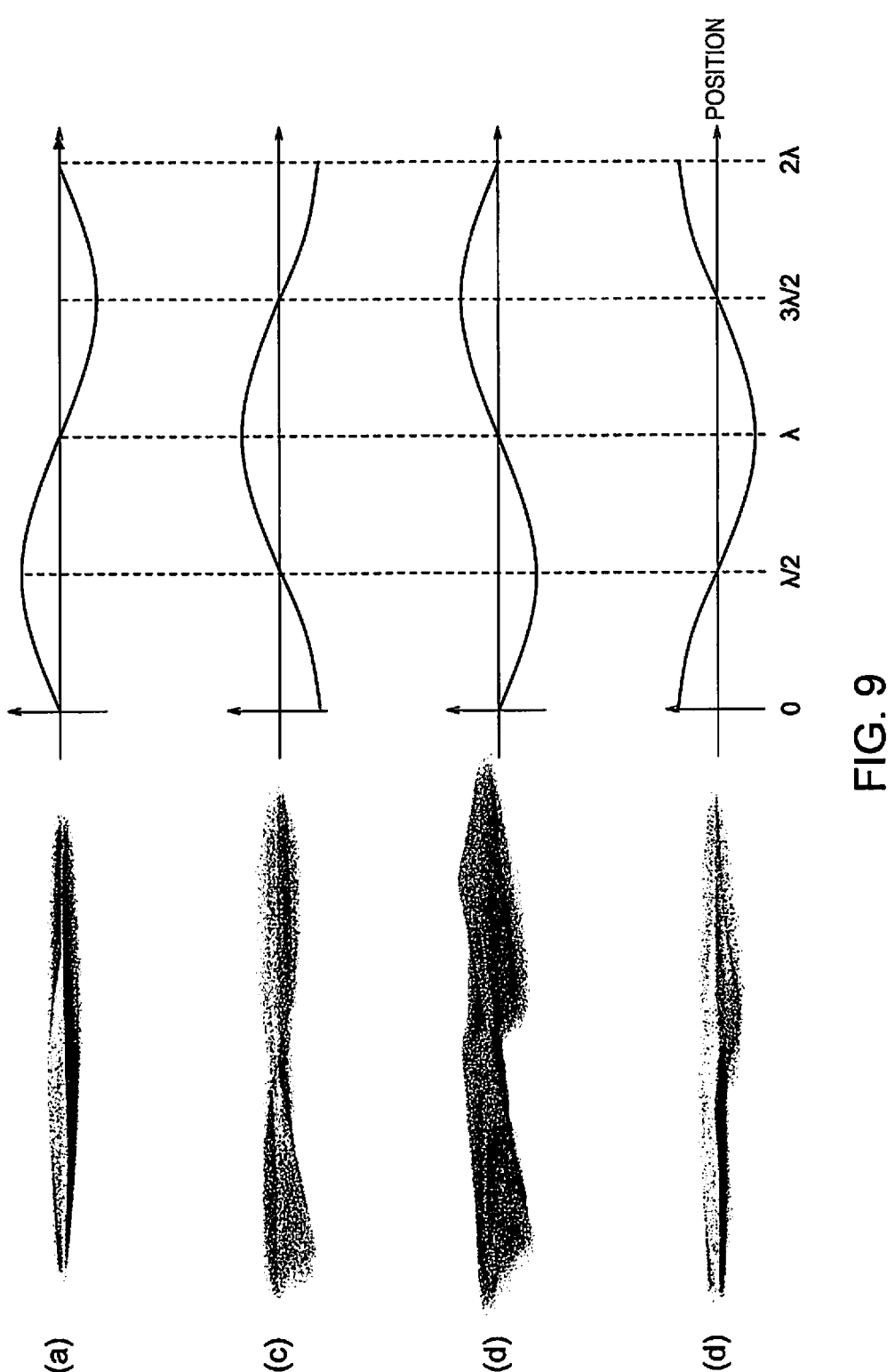
FIG. 9 shows animated images and graphs for explaining a temporal transition of the "voice detecting state" animation.

FIG. 9 shows graphs for explaining the temporal transition of the animation 73 representing the "voice-detecting state." The animation 73 changes the shape of the wave each cycle (2π). The wave shown by the animation 73 includes feature points that move cyclically. The feature points are represented by positions of the nodes/antinodes of the wave, positions of the vertices of the wave, color change points, and the like. Feature points are points that serve as indices for coordinating with other animations 71, 72, 74. In FIG. 9, (a) represents the animation 73 at time (0), and (b), (c), and (d) represent the animation 73 at times (π/2, π, 3π/2). The left side of FIG. 9 shows images of waves that are displayed on the display screen. The right side of FIG. 9 conceptually shows the movements of the feature points included in the waveform of the animation 73. For example, changes in the shape, color, hue, coordinates, etc., of the wave may be represented as waves (periodic function), and the waves may be superimposed to create a standing wave, which may be used to represent movements of the feature points. For example, the feature point at the center point (position=λ) of the wave representing the animation 73 is zero at times (0, π, 2π, . . . ), has maxima at times (π/2, 5π/2, 9π/2, . . . ), and minima at times (3π/2, 7π/2, 11π/2, . . . ). That is, the feature points move at the same cycle in accordance with the periodic motion of the animation 73. Changes in the feature points need not be represented solely by a movement or a color that the occupant can visually confirm and may be represented by points that are calculated arithmetically.

Figure 10:
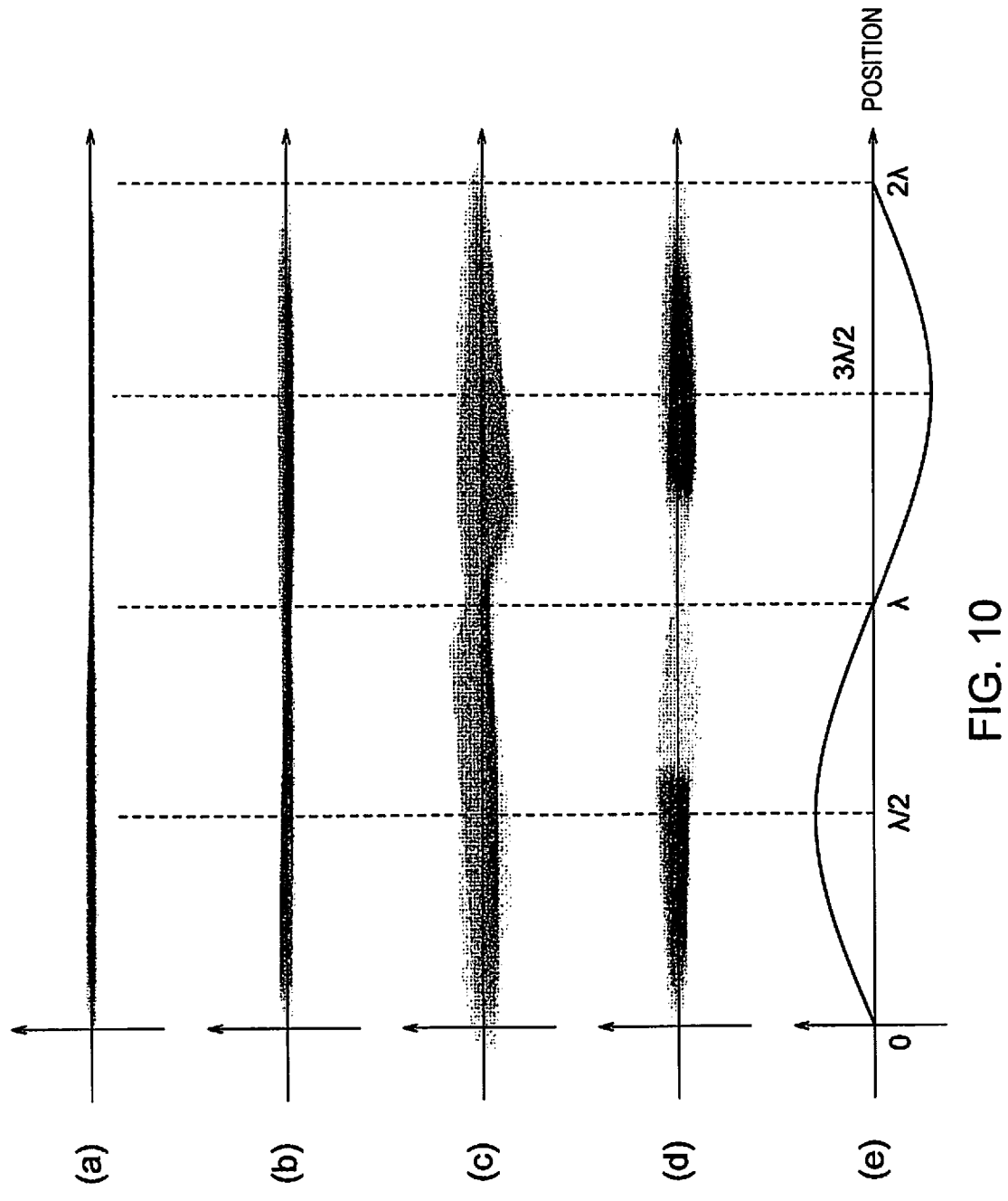
FIG. 10 shows animated images and a graph for explaining the temporal transition of the animation.

FIG. 10 shows graphs for explaining the relationship between the still images of the animations 71-74 and the feature points in each of the animations 71-74 at certain timepoints in the cycle. In FIG. 10, (a) represents the still image of the animation 71, and (b) to (d) represent the still images of the animations 72-74. (e) is a graph of the feature points in the animations 71-74. The shape of the wave, the color of the wave, etc., of the animations 71-74 are different for each animation, even at the same time in the cycle. The animations 71-74 have the same period. For example, the waveform of the animation 71 and the waveform of the animation 72 have different colors and shapes at time (π/2). On the other hand, the feature points having cyclical movements of the animations 71-74 are represented by the same waveform if the time in the cycle is the same.

Figure 11:
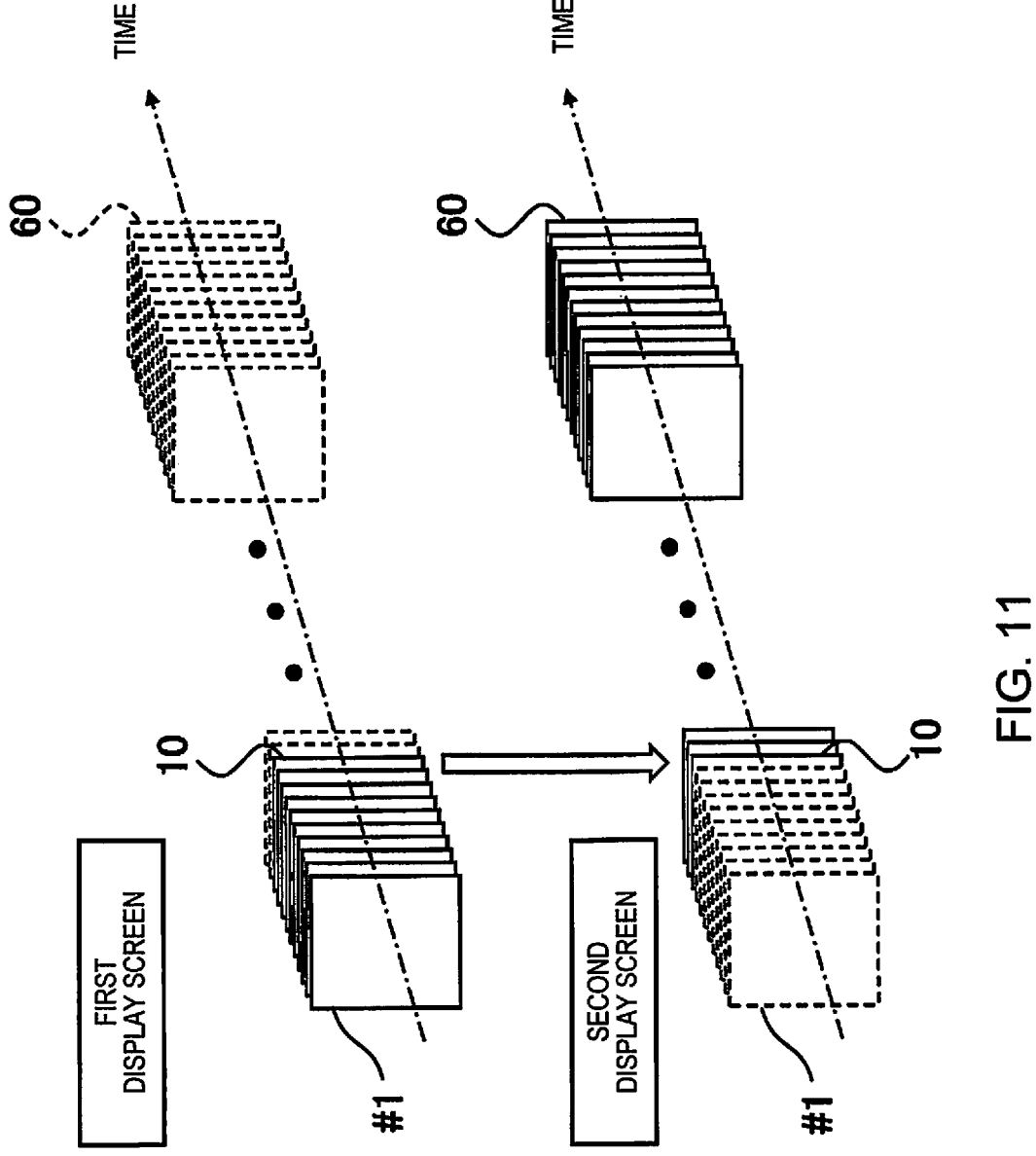
FIG. 11 is a conceptual diagram for explaining the configuration of an animated image and an index that is selected at the time of a screen transition.

The image configuration for displaying the animations 71-74 and screen transition of the display 10 will now be described with reference to FIG. 11. FIG. 11 is a conceptual diagram for explaining the image configuration for displaying the animations 71-74 and still images that are reproduced before and after a screen transition. In FIG. 11, the first and second display screens are display screens that are displayed in accordance with each operating state of the first dialogue system 112, the first display screen shows a screen before a transition, and the second display screen shows a screen after the transition. For example, when the operating state of the first dialogue system 112 switches from the "initial state" to the "voice-reception ready state" and the display screen of the display 10 makes a transition, the first display screen corresponds to the display screen of the "initial state," and the second display screen corresponds to the display screen of the "voice-reception ready state."

The animations 71-74 are displayed by means of the continuous playback of a plurality of still images. The images displaying the animations 71-74 consist of 60 still images, where each image is given an index from 0 to 59. The number of still images is the same for each of the animations 71-74. The indices are identifiers for the still images and represent the order of playback. The indices are assigned to the still images such that the feature points having cyclical movements correspond to each other between the images included in the animations 71-74. For example, in the example of FIG. 10, the still images of the animations 71-74 represent images at the same time in the cycle, so that the same index is assigned thereto. In other words, when the still images are compared between the animations 71-74, the still images in which the feature points correspond to each other are assigned the same index.

When displaying the animations 71-74, the display control unit 130 outputs images to the display 10 at a playback rate of 30 still images per second. That is, the time slot (display interval) of the still images is 20 msec per image. The display control unit 130 starts the playback of the still images in the order of the assigned indices. In this manner, in the present embodiment, because the animations 71-74 are displayed by playing back a plurality of still images, the processing load on the CPU can be reduced. Further, when executing a screen transition from the first display screen to the second display screen, the display control unit 130 displays up to the pre-transition image, which is the still image immediately before the screen transition, and selects the second index corresponding to the first index assigned to the pre-transition image. The display control unit 130 then starts the playback of the second still image from the selected second index.

In the example shown in FIG. 11, the display control unit 130 starts image playback from a still image assigned the index "#0" in order to display the "initial state" of the first dialogue system 112 by means of the animation 71. Then, it is assumed that, while the still image assigned the index "#9" is displayed, the operating state of the first dialogue system 112 transitions from the "initial state" to the "voice-reception ready state.". The display control unit 130 selects from among the 60 still images for displaying the animation 72, the still image assigned the same index "#9" as the index assigned to the pre-transition image. Until the time slot for the pre-transition image has elapsed, the display control unit 130 displays the pre-transition image on the display 10, and, at the point in time at which the time slot for the pre-transition image has elapsed, starts the playback of the images for displaying the animation 72 from the selected index "#9." That is, when executing a screen transition, the display control unit 130 selects an index such that the feature points having cyclical movements displayed in the animation 71 and the feature points having cyclical movements displayed in the animation 72 maintain continuity, and starts the playback of the still images from the selected index.

It should be noted that if the operating state of the first dialogue system 112 changes and the display screen of the display 10 makes a transition, and playback of the still images is started from the first index "#0" at the timing of the screen transition, the display will appear as if the movement of the wave were interrupted in the middle; thus, the movement of the animation would appear as if it were interrupted. That is, in the example of FIG. 11, if the index is not handed over at the time of the transition from the first display screen to the second display screen and the playback order is reset, the feature points will not correspond to each other between the still images before and after the transition, and the animation will appear unnatural.

In the present embodiment, indices are assigned such that the feature points having cyclical movements correspond to each other among the images included in each of the animations 71-74, and the still images are played back after the index is transferred at the time of a screen transition. As a result, the continuity of the animation display can be maintained even if the method of rendering the animation changes, so that the animation can be displayed with a natural appearance before and after a screen transition. In addition, in the present embodiment, at the time of a screen transition, a state in which the pre-transition still image is displayed on the display 10 is maintained, and at the point in time at which the time slot for the pre-transition still image has elapsed, the display is switched to the second display screen. It is thus possible to maintain continuity of the animation.

Figure 12:
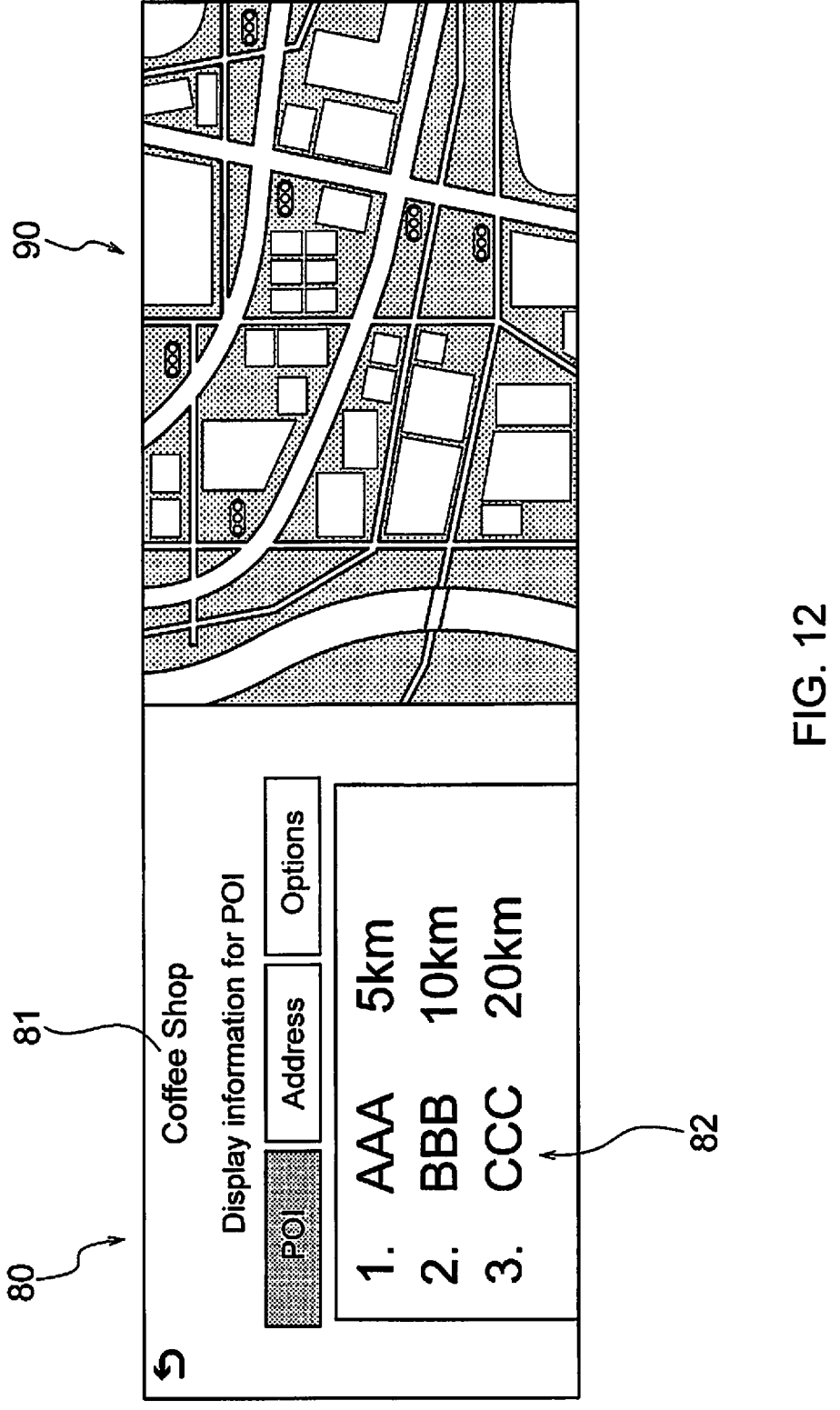
FIG. 12 is a diagram showing a display screen of the display of FIG. 1.

The display screen after a normal completion of the voice recognition process by the first dialogue system 112 will now be described. FIG. 12 shows the display screen of the display 10 after the first dialogue system 112 recognizes voice related to a POI. For example, assume that after the first dialogue system 112 is activated, the occupant utters "Coffee Shop" as voice related to a POI in a state in which the display 10 is displaying the display screen of FIG. 6. The voice recognition unit 111 detects the voiced "Coffee Shop" and executes a voice recognition process. When the voice recognition process is completed normally, the dialogue system control unit 110 determines, from the word related to the POI (Point of Interest) that is input by means of voice, that the occupant is looking for a "Coffee Shop" near the current location, and outputs a control command to the display control unit 130 to cause the display 10 to display a guidance image 80 related to the POI and a map 90 of the area near the current location. As shown in FIG. 12, the guidance image 80 includes a character string 81 representing the result of the voice recognition and POI information 82. The character string 81 is a character string of the speech recognized by the first dialogue system 112. In the example shown in FIG. 12, "Coffee Shop" is displayed. The occupant can thus confirm what type of speech was recognized by the system. The POI information 82 shows information related to the POI, such as the names and distances from the current location of the POIs that are in the vicinity of the current location.

Figure 13:
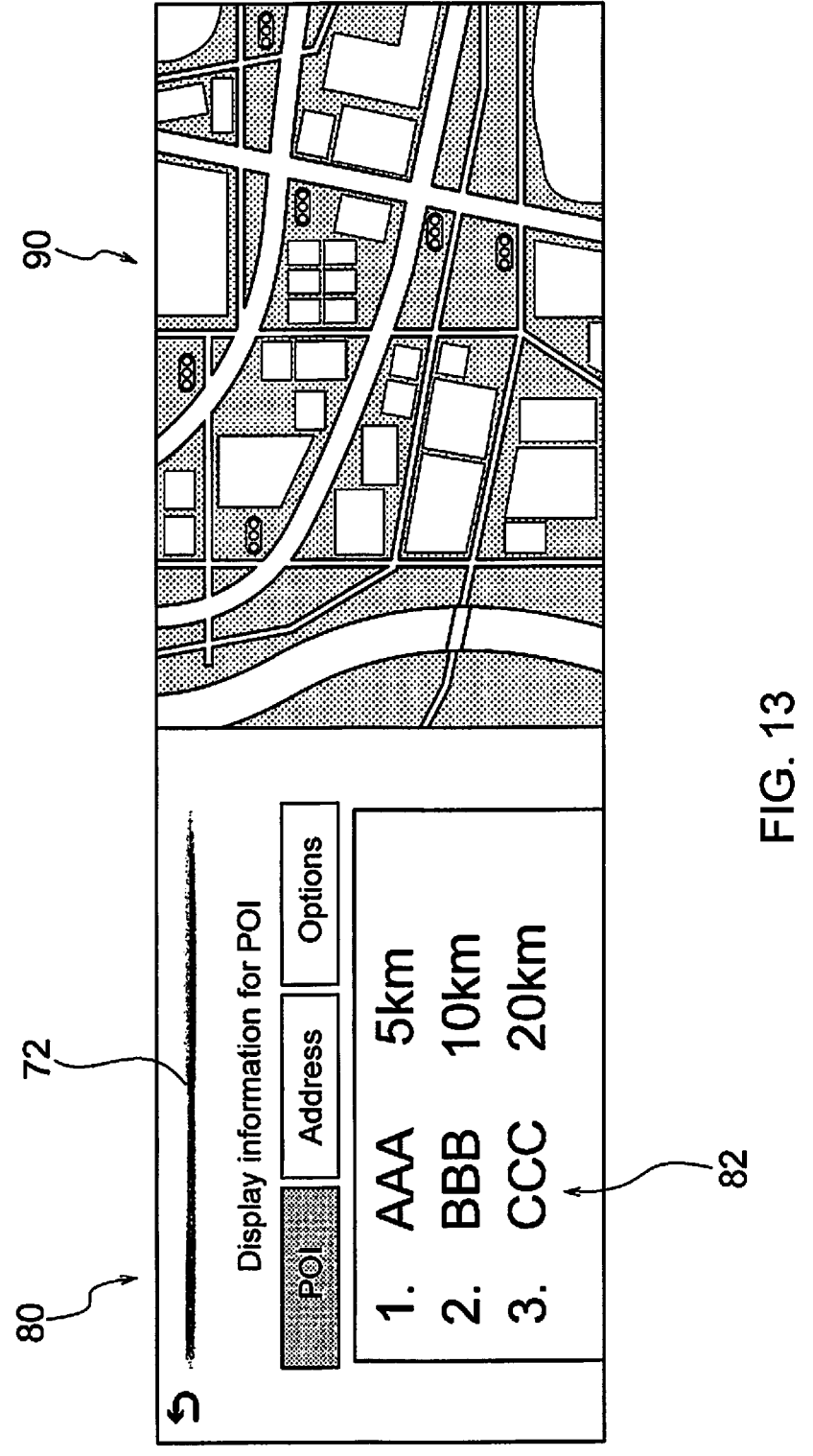
FIG. 13 is a diagram showing a display screen of the display of FIG. 1.

After a prescribed period of time has elapsed from the state of the display screen of FIG. 12 displaying the character string 81, the display screen of the display 10 transitions to the screen of FIG. 13. When the voice recognition process based on the utterance of "Coffee Shop" is completed, the first dialogue system 112 again enters the voice-reception ready state. On the display screen of the display 10, the animation 72 representing the "voice-reception ready state" is displayed in the position at which the character string 81 was displayed. That is, the occupant can observe the display of the animation 72 where the character string 81 of "Coffee Shop" was displayed, and thereby confirm that the occupant may say the words that are to follow "Coffee Shop."

Figure 14:
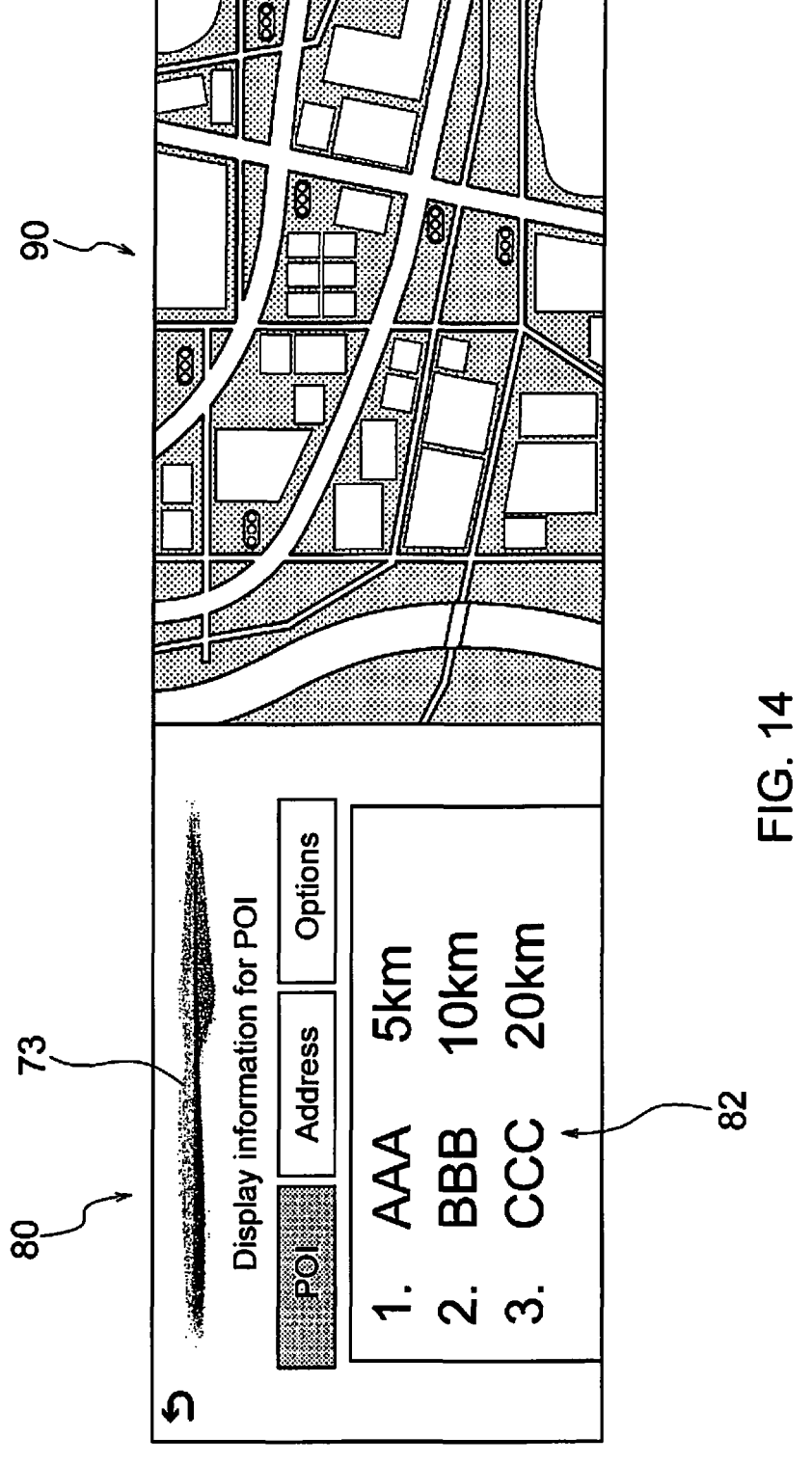
FIG. 14 is a diagram showing a display screen of the display of FIG. 1.
Figure 15:
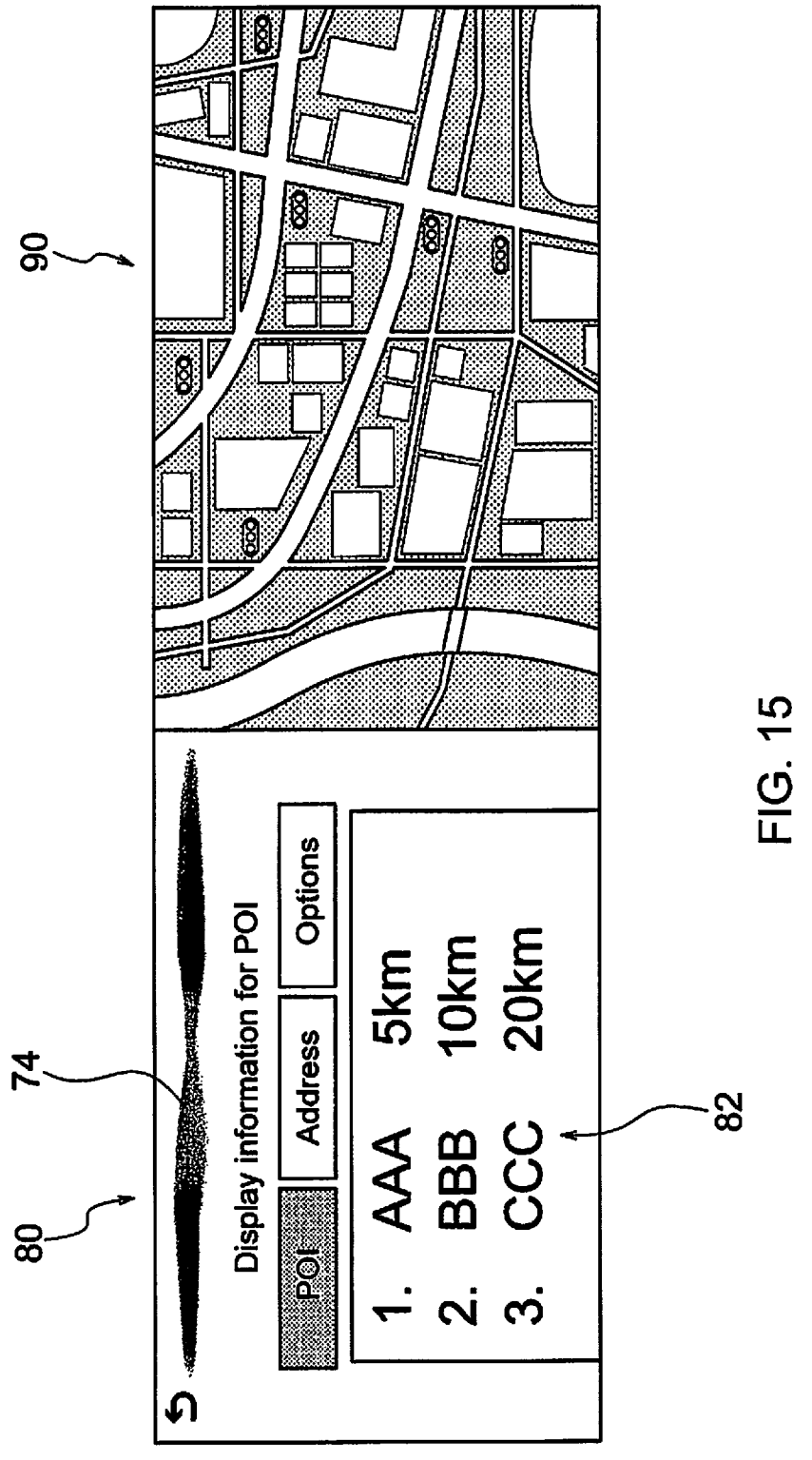
FIG. 15 is a diagram showing a display screen of the display of FIG. 1.

If the occupant reads out a store name that is included in the POI information 82, for example, from the state of the display screen of FIG. 13, the first dialogue system 112 detects the voice of the occupant. As shown in FIG. 14, as the voice is detected, in the display screen of the display 10, the display of the animation 70 becomes the animation 73 representing the "voice-detecting state." Thereafter, when the voice processing state is entered after voice detection is completed, the display of the animation 70 becomes the animation 74 representing the "voice processing state," as shown in FIG. 15. The occupant can thus confirm the processing status of the first dialogue system by means of the display on the display 10 while viewing the map information and POI guidance information.

If the voice processing does not complete normally from the state of the display screen shown in FIG. 14, the first dialogue system 112 outputs a control signal to the display control unit 130 indicating that voice recognition has failed. The display control unit 130 displays the animation 71 of the gray waveform at the position of the animation 73 in the display screen of FIG. 14. The occupant can thus confirm from the display on the display 10 that voice recognition has failed. In the case of a voice recognition failure, voice such as "please input voice again" may be output to prompt the occupant to speak.

As described above, in the present embodiment, the display control unit 130 switches the display screen in accordance with the status of the first dialogue system 112. That is, the display control unit 130 switches between screens including images (corresponding to the "First information display image" of the present invention) displaying the main message 50 and the sample message, as shown in FIGS. 5-8, and screens including images (corresponding to the "second information display image" of the present invention) displaying map information and POI-related information for display on the display 10, as shown in FIGS. 12-15. At this time, each display screen includes the images of the animation 70. Then, when a pre-transition screen (corresponding to the display screens shown in FIGS. 5-8) is compared with a post-transition screen (corresponding to the display screens shown in FIGS. 12-15), the display of the animation 70 included in the pre-transition image and the display of the animation 70 included in the post-transition image are different in terms of position and size. This allows both the presentation of information using the first dialogue system 112 and the display of the operating state of the first dialogue system 112.

The transition of the display screen of the display 10 when voice processing is not completed normally from the "voice-reception ready state" of the first dialogue system 112 will be described next. Cases in which voice processing is not completed normally are cases in which a prescribed period of time has elapsed in the "voice-reception ready state." For example, if the occupant does not speak after the display screen of the display 10 becomes the screen shown in FIG. 6, the voice recognition unit 111 does not detect voice. If such a state continues for a prescribed period of time, the voice recognition unit 111 determines that voice processing will not be completed normally. In addition, cases in which voice processing is not completed normally include cases in which an abnormality occurs during voice processing. The voice recognition unit 111 executes the voice recognition process with respect to the detected voice. Then, if the input voice cannot be analyzed or if there is no command 61 corresponding to the analyzed voice, the voice recognition unit 111 determines that the voice processing is abnormal. Cases of abnormal voice processing determinations also correspond to cases in which voice processing is not completed normally.

Figure 16:
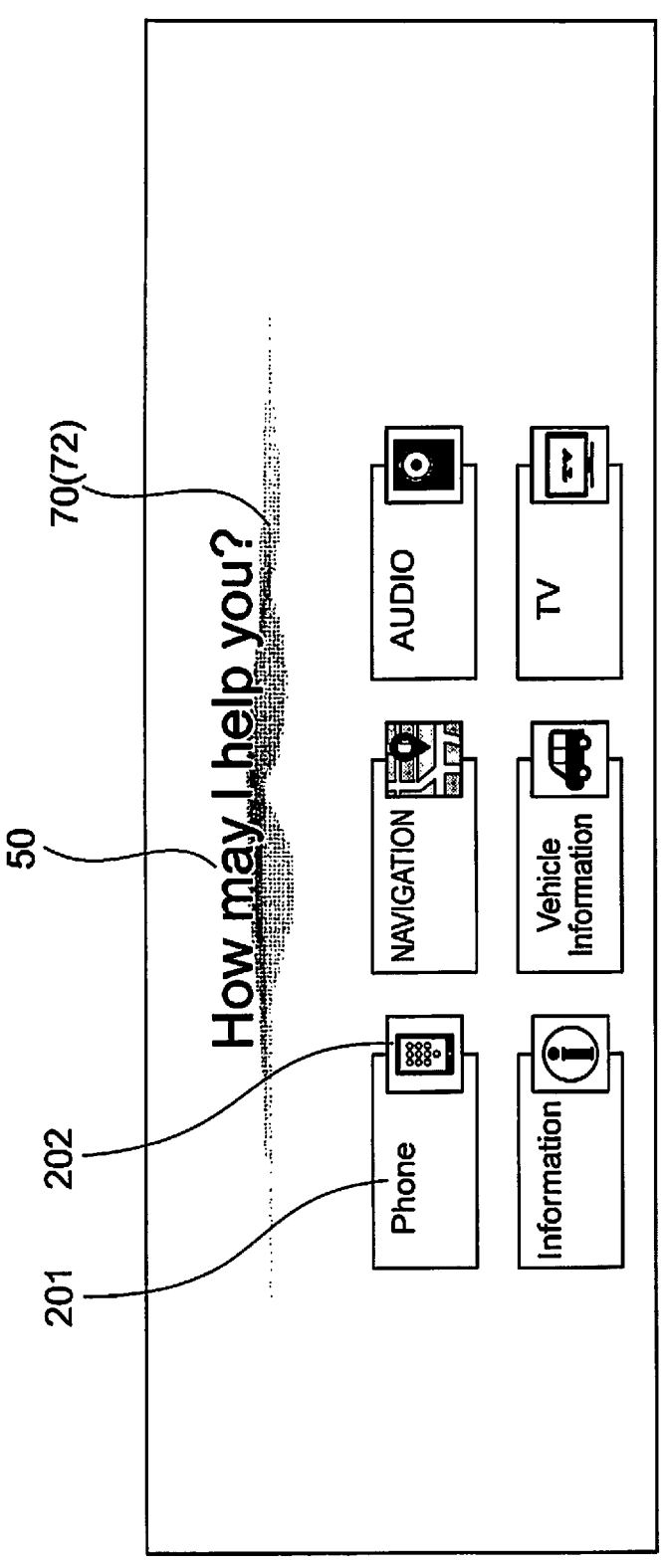
FIG. 16 is a diagram showing a display screen of the display of FIG. 1.

As described above, when the first dialogue system 112 is in the "voice-reception ready state," the display 10 displays the main screen, as shown in FIG. 6. Then, when it is determined that voice processing will not be completed normally, the display screen on the display 10 becomes the screen shown in FIG. 16. FIG. 16 shows the display screen on the display 10 when voice processing is not completed normally from the "voice-reception ready state."

When voice processing is not completed normally, the display control unit 130 displays a category screen, as shown in FIG. 16. The category screen includes category images that group the commands 61. A plurality of commands are grouped together, and the category images represent the group names by means of text or icons. Each category image includes a name 201 and an icon 202 for the category. For example, a plurality of telephone-related commands, such as "call and/or dial," "redial," "telephone," and the like, are grouped into a single category, "Phone." The icon 202 for the category is displayed next to the category name 201. The groupings of the commands 61 are not limited to telephone, and may include navigation and audio commands, and the names and icons of the grouped categories are included in the category screen. In addition, the images and icons 202 including the category names 201 represent areas in which touch operation is enabled. That is, the images and icons 202 including the category names 201 also have button functions for allowing the occupant to select a category. For example, if the occupant touches the icon for the category "Phone" or an image including the name 201 of the category "Phone," the display control unit 130 changes the display screen from the category screen to a list screen, described further below. The category images to be displayed on the main screen need only include at least one of the name 201 or the icon 202.

In addition to the category name 201 and the icon 202, the category screen includes the main message 50 and the animation 70. The animation 70 is the animation 72 representing the "voice detecting state." The voice recognition process carried out by the voice recognition unit 111 also effectively functions when the category screen is displayed, so that the occupant can confirm that the operating state of the first dialogue system 112 is the "voice-reception ready state" from the display of the animation 72.

If the occupant does not understand the voice for operating the first dialogue system, the occupant can proceed with the dialogue system from the display of the category name 201 and icon 202. In addition, even if voice cannot be processed normally due to noise, or the like, category images (icons) that also function as buttons may be displayed, thereby allowing the occupant to operate the dialogue system. In addition, those category images that also function as buttons that are frequently used are displayed, which enhances convenience. In addition, because the category screen includes the main message 50 and the animation 72, the occupant can confirm from the screen display that it is possible to continue through the system by interacting with the controller 100.

The category and/or the list selection by the occupant may be by means of voice input or another switch operation. That is, the controller 100 may determine the presence or absence of a category selection based on any one of the occupant's voice, the occupant's touch operation of the display screen of the display 10, or the occupant's switch operation, in a state in which the category screen is displayed on the display 10.

Figure 17:
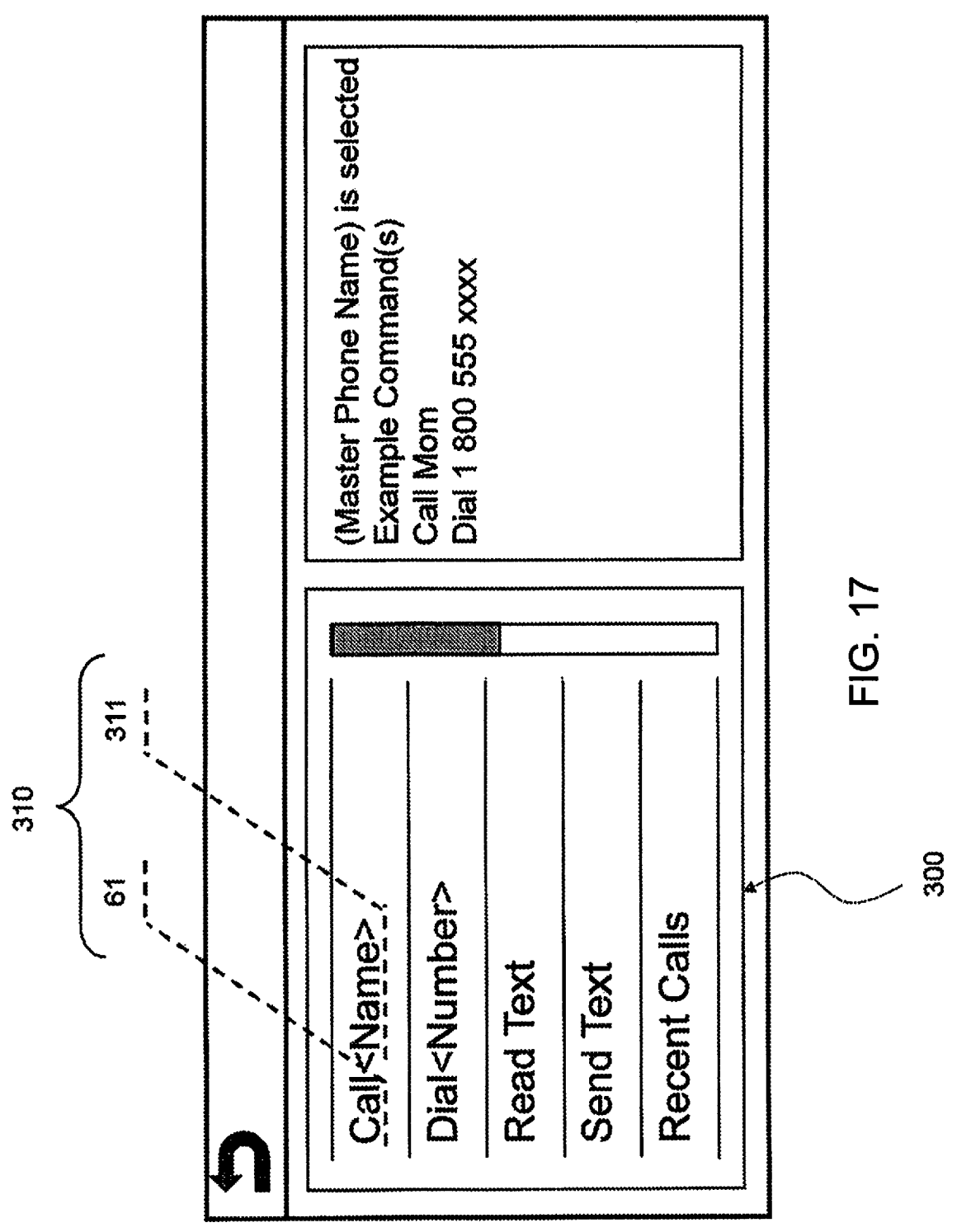
FIG. 17 is a diagram showing a display screen of the display of FIG. 1.

If the occupant selects a category from the category screen, the display control unit 130 causes the display 10 to display a list screen, such as that shown in FIG. 17. FIG. 17 shows a list screen that is displayed on the display 10.

Figure 18:
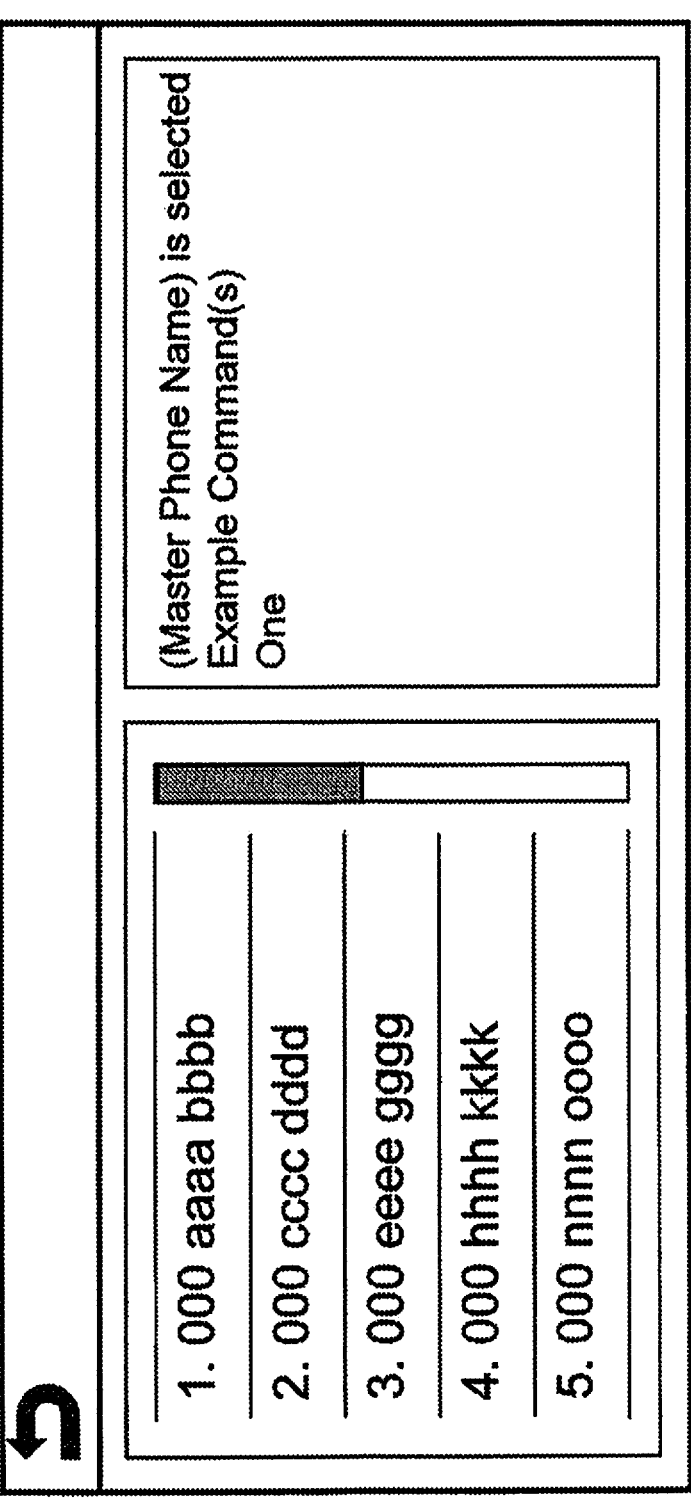
FIG. 18 is a diagram showing a display screen of the display of FIG. 1.

The list screen is an image including grouped commands, and includes a list 300 having a plurality of commands. The list 300 has a plurality of syntaxes 310, and the syntax 310 has at least the command 61, and also a sample text 311 in addition to the command. The list screen does not include the animation 70. The syntax 310 displays by means of text a combination of the command 61 and the setting value 62. The sample text 311 shows an arbitrary text of the setting value 62 following the command, and shows information of either a character string or a numerical string assigned to the syntax 310. For example, the syntax at the top of the list is composed of a "Call" command and a sample text "<Name>." "<Name>" indicates that the setting value 62 such as a person's name or a store name is entered after the command. If the occupant touches the display of the syntax 310 in the list, an example of the setting value 62 entered in the sample text 311 is shown to the right of the list 300. In addition, if the occupant touches the display of the syntax 310 in the list by means of a double tap, or the like, a list of settings that are entered in the sample text 311, such as that shown in FIG. 18, is displayed. For example, in the display screen of FIG. 17, if the syntax "Call <Name>" at the top of the list is selected, information related to either a character string or a numerical string assigned to the syntax 310 is displayed, as shown in FIG. 18. In the list screen of FIG. 18, the occupant can touch the number display to select the command 61 and the sample assigned to the syntax 310. In the example of FIG. 18, if the syntax "Call <Name>" at the top of the list is selected, the controller 100 may call the number in the list that is touched, or display a notification to the effect that a call will be made on the display 10.

An example of a model flow of a dialogue in the dialogue system will be described next. FIGS. 19, 20, and 22-25 show response messages that the controller 100 returns with respect to utterances of the occupant. In FIGS. 19, 20, and 22-25, "Customer" indicates examples of messages spoken by the occupant, and "IVI" indicates examples of messages generated by the dialogue system. FIGS. 19, 20, and 22-25 are merely examples, and the dialogue system can carry out a dialogue using other model flows.

FIG. 19 is a model flow of a dialogue relating to the temperature setting of the air conditioner 41. For example, when the occupant says "Hey ○○," the controller 100 emits the message in Japanese "please input by voice, or select, a command" by means of a mechanical sound. For example, in the model flow of FIG. 19, by issuing a message shown in the column "Customer" in FIG. 19 in a state in which the display screen of FIG. 6 is displayed on the display 10, the dialogue system proceeds forward and the set-point temperature of the air conditioner 41 can be changed.

Figure 21:
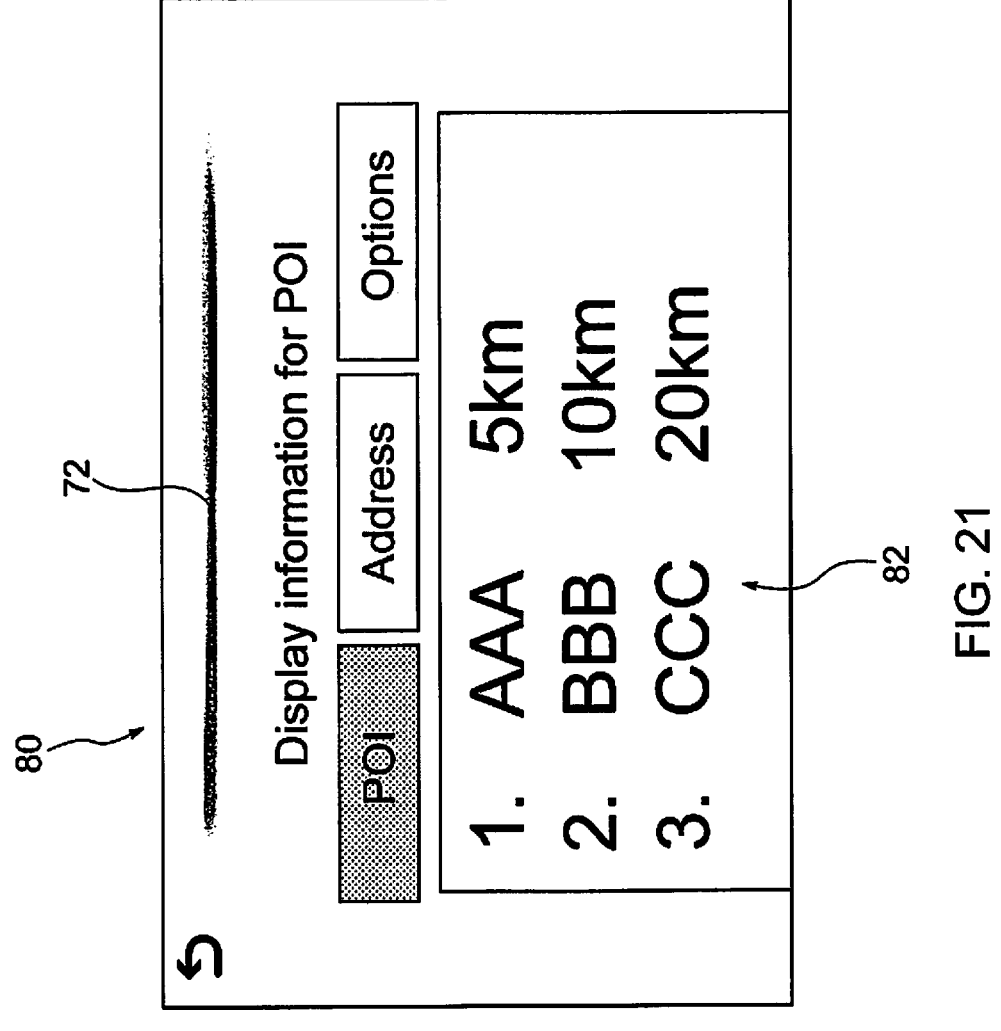
FIG. 21 is a diagram showing a display screen of the display of FIG. 1.

FIG. 20 is a model flow of a dialogue pertaining to a POI search. For example, when the occupant voices the wake-up word and the voice is processed normally, the controller 100 responds with the message "please input by voice, or select, a command." The occupant then voices the message "I want to go to a cafe near the destination," which includes a word that can specify a POI, such as the type of the shop. After recognizing this message, the controller 100 carries out a search using the navigation system and responds with the message "please input by voice an item number from the displayed list, or select another tab." At this time, the display screen shown in FIG. 21 is displayed on the display 10. The controller 100 displays the guidance image 80 pertaining to the POI on the display 10. The controller 100 can also display a map. The guidance image 80 includes the animation 72 indicating the "voice-reception ready state" and the POI information 82 obtained from the search result. Item numbers are assigned to the POI information. The occupant can voice an item number to select a POI. In the example of FIG. 21, the occupant says "one," thereby selecting the POI "AAA." The controller 100 repeats the "one" spoken by the occupant and responds with the next selection message, such as "do you want to change the destination?"

Figure 23:
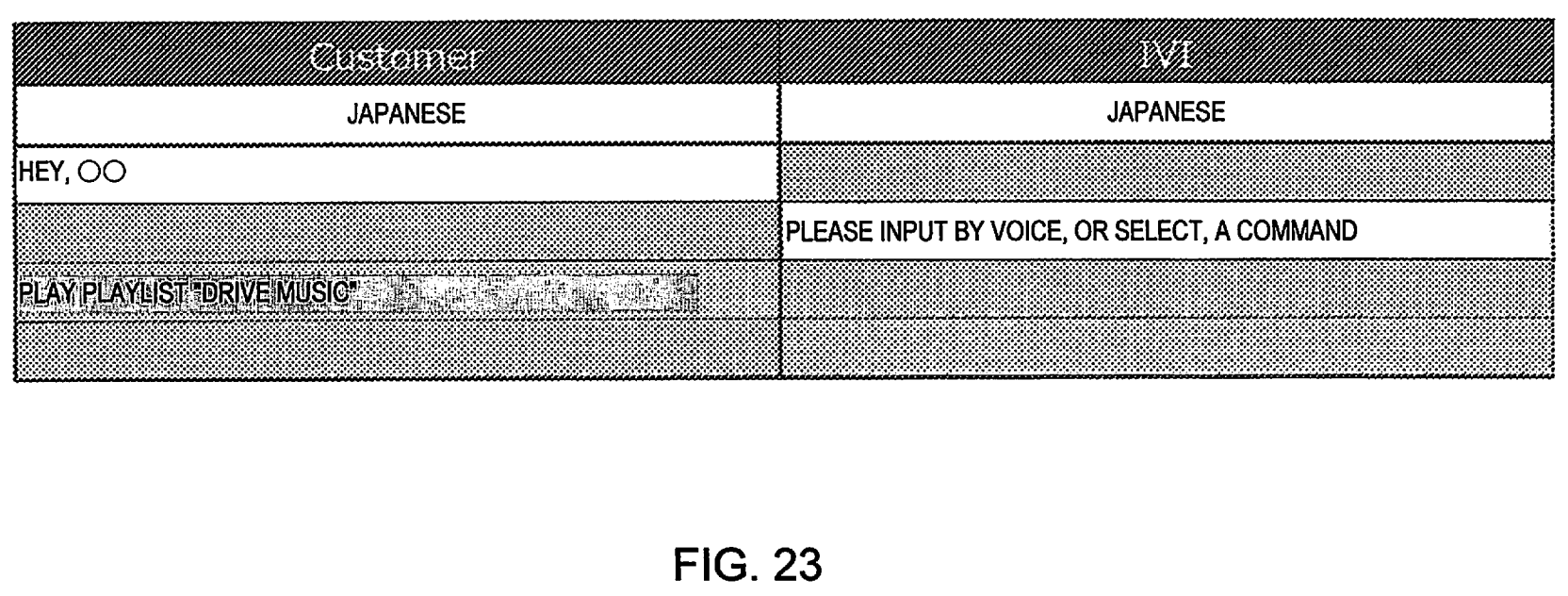

FIG. 22 is a model flow of a dialogue related to the destination. FIG. 23 is a model flow of a dialogue related to music playback. FIG. 24 is a model flow of a dialogue related to sending an SMS (short message). FIG. 25 is a model flow of a dialogue related to sending and receiving an SMS (short message).

As described above, in the present embodiment, the controller 100 comprises the voice recognition unit 111 that detects voice input from the occupant and recognizes the voice by means of voice processing of the detected voice, and the display control unit 130 that causes the display 10 to display a main screen including an operating state image indicating an operating state of a dialogue system that includes sample messages with commands, and a category screen including a category image in which commands are grouped. Then, the controller 100 causes the display 10 to display the main screen before the voice recognition unit 111 detects the voice, causes the display 10 to display the category screen when the voice processing is not completed normally, and changes the display screen of the display 10 from the category screen to another screen when a category is selected in a state in which the category screen is displayed. Thus, in the present embodiment, the main screen has a simple screen structure. Further, even if the voice processing in the dialogue system is not completed normally and the voice processing does not proceed, the main screen transitions to the next screen. As a result, even if the occupant is unaccustomed to using the dialogue system and the voice processing does not proceed, the screen transition will proceed. As a result, for occupants who are accustomed to using the dialogue system, complicated operations can be avoided, and, for occupants who are unaccustomed to using the dialogue system, the screen can be advanced, so that the service can be provided without operating the dialogue system. As a result, the operability can be improved.

In addition, in the present embodiment, a display control method executed by the controller 100 comprises activating a dialogue system that interacts with an occupant and provides a service; outputting, in a state before the dialogue system detects the voice, a control command to the display 10 to cause the display to display a main screen including an operating state image indicating the operating state of the dialogue system; detecting the occupant's voice input and executing voice processing of the detected voice; outputting a control command to the display 10 to display a category screen including a category image in which commands are grouped if the voice processing is not completed normally; and outputting a control command to the display 10 to change the category screen to another screen if a category is selected in a state in which the category screen is displayed. As a result, for occupants who are accustomed to using the dialogue system, complicated operations can be avoided, and, for occupants who are unaccustomed to using the dialogue system, the screen can be advanced, so that the service can be provided without operating the dialogue system. As a result, the operability can be improved.

In the present embodiment, the communication device 20 may be a part of the controller 100, and the communication path between the voice recognition unit 111 and the communication device 20 may be a communication path within the voice recognition unit 111, rather than an in-vehicle communication path. In addition, the second dialogue system 32 may use a voice recognition engine (corresponding to the "second voice recognition engine" of the present invention) to carry out voice processing.

The embodiment described above has been explained to facilitate understanding of the present invention and is not intended to limit the present invention. Therefore, the elements disclosed in the embodiment above are intended to include all design modifications and equivalents thereto that are within the technical scope of the present invention.

The invention claimed is:

1. A display control device that controls a display screen of a display based on a voice of an occupant of a vehicle, the display control device comprising:
a controller including a voice recognition unit configured to detect a voice input of the occupant and recognize the voice by voice processing of a detected voice; and
a display control unit configured to control the display to display a main screen including an operating state image indicating an operating state of a dialogue system and to display a category screen including a category image in which commands are grouped,
the controller being configured to
control the display to display the main screen before the voice recognition unit detects the voice, control the display to display the category screen when the voice processing is not completed normally in the main screen, and
change the display screen from the category screen to another screen when a category is selected in a state in which the category screen is displayed.

2. The display control device according to claim 1, wherein
the display control unit is configured to control the display to display a list screen including a list of the commands that have been grouped.

3. The display control device according to claim 2, wherein
the controller is configured to determine whether the list is selected based on any one of the voice of the occupant, a touch operation on the display by the occupant, or a switch operation by the occupant while the list screen is displayed on the display.

4. The display control device according to claim 2, wherein
the list screen includes sample text,
the list is a list grouping a plurality of syntaxes each having at least a command, and
the sample text includes information pertaining to either a character string or a numerical string assigned to the syntaxes.

5. The display control device according to claim 4, wherein
the controller is configured to control the display to display a screen for selecting sample text of either the character string or the numerical string assigned to the syntaxes.

6. The display control device according to claim 2, wherein
the list screen does not include animation.

7. The display control device according to claim 1, wherein
the operating state image includes an image of at least one of a message indicating the operating state of the dialogue system and an animation that moves in accordance with the operating state of the dialogue system, and
the category screen includes an image of at least one of a name of the category and an icon of the category.

8. The display control device according to claim 1, wherein
the category screen includes an animation that moves in accordance with the operating state of the dialogue system.

9. The display control device according to claim 1, wherein
the controller is configured to control the display to display the category screen when a prescribed period of time has elapsed in a state in which the voice input can be accepted before the voice processing is completed normally.

10. The display control device according to claim 1, wherein
the controller is configured to determine an abnormality of the voice processing when the command cannot be recognized from a content of an occupant's utterance, and to control the display to display the category screen upon determining that the voice processing is abnormal.

11. The display control device according to claim 1, wherein

21 the controller is configured to determine whether the category is selected based on any one of the voice of the occupant, a touch operation on the display by the occupant, or a switch operation by the occupant while the category screen is displayed on the display.

12. The display control device according to claim 1, wherein the main screen includes a sample message including the commands.

13. The display control device according to claim 1, wherein the controller being further configured to determine that the voice processing is not completed normally upon determining that the voice input of the occupant is not received within a predetermined amount of time after displaying the main screen or upon determining occurrence of an abnormality during the voice processing.

14. A display control method for controlling a display screen of a display based on a voice of an occupant of a vehicle, the display control method comprising:

activating a dialogue system that interacts with the occupant to provide a service;

outputting a control command to the display to control the display to display a main screen including an operating state image indicating an operating state of the dialogue system while in a state before the dialogue system detects the voice;

detecting a voice input of the occupant and executing voice processing of a detected voice;

outputting a control command to the display to display on the main screen for displaying a category screen including a category image in which commands are grouped when the voice processing is not completed normally; and outputting a control command to the display to change the category screen to another screen when a category is selected in a state in which the category screen is displayed.

15. The display control method according to claim 14, wherein the voice processing is not completed normally upon determining that the voice input of the occupant is not received within a predetermined amount of time after displaying the main screen or upon determining occurrence of an abnormality during the voice processing.

16. A display control device that controls a display screen of a display based on a voice of an occupant of a vehicle, the display control device comprising:

a controller including a voice recognition unit configured to detect a voice input of the occupant and recognize the voice by voice processing of a detected voice; and a display control unit configured to control the display to display a main screen including an operating state image indicating an operating state of a dialogue system, to display a category screen including at least one of a name of the category and an icon of the category in which commands are grouped, and to display a list screen including a list grouping a plurality of syntaxes having at least commands, the controller being configured to control the display to display the main screen before the voice recognition unit detects the voice, control the display to display the category screen when the voice processing is not completed normally in the main screen, and change the display screen from the category screen to the list screen when a category is selected in a state in which the category screen is displayed.

17. The display control device according to claim 16, wherein the controller being further configured to determine that the voice processing is not completed normally upon determining that the voice input of the occupant is not received within a predetermined amount of time after displaying the main screen or upon determining occurrence of an abnormality during the voice processing.

* * * * *